United States Patent
Takei

(10) Patent No.: US 8,917,517 B2
(45) Date of Patent: Dec. 23, 2014

(54) ELECTRONIC APPARATUS, BATTERY PACK, AND BATTERY PACK MOUNTING METHOD

(75) Inventor: Takanori Takei, Nagano (JP)

(73) Assignee: Sony Corporation, Tokyo (JP)

(*) Notice: Subject to any disclaimer, the term of this patent is extended or adjusted under 35 U.S.C. 154(b) by 465 days.

(21) Appl. No.: 13/121,696

(22) PCT Filed: Aug. 11, 2010

(86) PCT No.: PCT/JP2010/005032
§ 371 (c)(1),
(2), (4) Date: Mar. 30, 2011

(87) PCT Pub. No.: WO2011/021369
PCT Pub. Date: Feb. 24, 2011

(65) Prior Publication Data
US 2011/0176283 A1   Jul. 21, 2011

(30) Foreign Application Priority Data
Aug. 21, 2009   (JP) .................... 2009-192408

(51) Int. Cl.
*H05K 5/00* (2006.01)
*G06F 1/16* (2006.01)
*H01M 2/10* (2006.01)

(52) U.S. Cl.
CPC ........... *G06F 1/1635* (2013.01); *H01M 2/1066* (2013.01)
USPC ........................................................ 361/752

(58) Field of Classification Search
CPC ......... H05K 7/14; H05K 7/18; H05K 7/1402; H05K 7/1417; H05K 7/1422; H05K 7/1427; H05K 7/1429; G06F 1/18; G06F 1/181; G06F 1/183; G06F 1/184; G06F 1/188

USPC ..................... 361/752, 679.01, 748, 753, 760
See application file for complete search history.

(56) References Cited

U.S. PATENT DOCUMENTS

| 6,617,063 | B1 | 9/2003 | Ohnishi | |
|---|---|---|---|---|
| 2006/0056142 | A1* | 3/2006 | Takahashi et al. | 361/683 |

(Continued)

FOREIGN PATENT DOCUMENTS

| JP | 10 275605 | 10/1998 |
|---|---|---|
| JP | 11 354090 | 12/1999 |

(Continued)

OTHER PUBLICATIONS

International Search Report issued Nov. 16, 2010 in PCT/JP10/05032 filed Aug. 11, 2010.

(Continued)

*Primary Examiner* — Tremesha S Willis
(74) *Attorney, Agent, or Firm* — Oblon, Spivak, McClelland, Maier & Neustadt, L.L.P.

(57) ABSTRACT

A battery pack includes first casing portions incorporating secondary batteries and a second casing portion incorporating a control board and a wiring sheet metal. The second casing portion is less thick than the first casing portions. By increasing areas of the first casing portions when thinning the battery pack, for example, secondary batteries having large areas can be incorporated while preventing the capacity from becoming smaller. By appropriately setting the arrangement position of the second casing portion having a small thickness, the battery pack can be mounted to an electronic apparatus without causing an interference with other members such as a pointing device.

10 Claims, 25 Drawing Sheets

(56) References Cited

U.S. PATENT DOCUMENTS

2006/0210866 A1 9/2006 Horii et al.
2008/0220320 A1 9/2008 Horikoshi et al.

FOREIGN PATENT DOCUMENTS

| JP | 2001 118552 | 4/2001 |
| JP | 2001 143673 | 5/2001 |
| JP | 2006 260255 | 9/2006 |
| JP | 2007 115091 | 5/2007 |
| JP | 2008 218210 | 9/2008 |
| JP | 2009 104665 | 5/2009 |
| JP | 2010-061908 | 3/2010 |

OTHER PUBLICATIONS

Japanese Office Action issued Nov. 26, 2013 in Japanese Application No. 2009-192408.

* cited by examiner

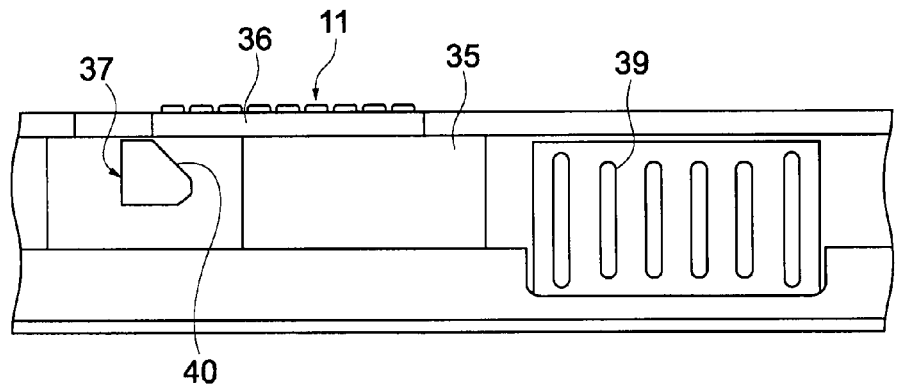
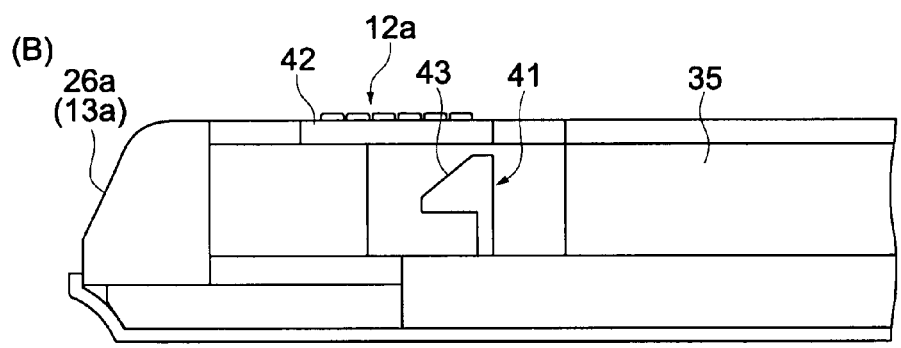
FIG.8

(A)
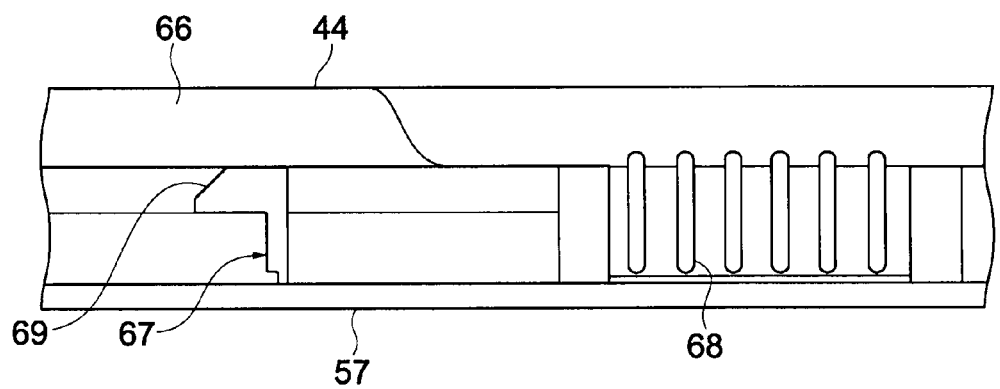
(B)
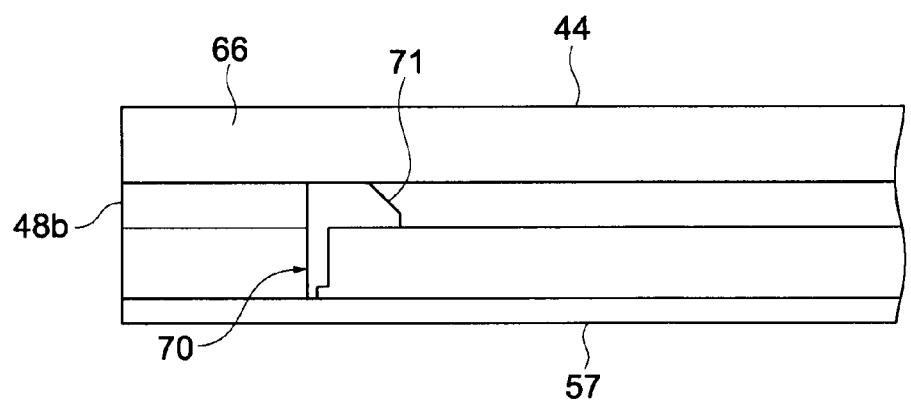
FIG.15

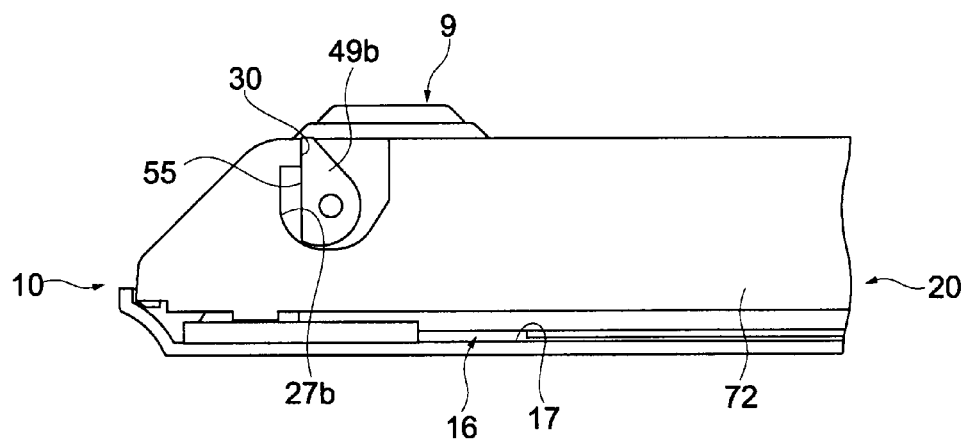
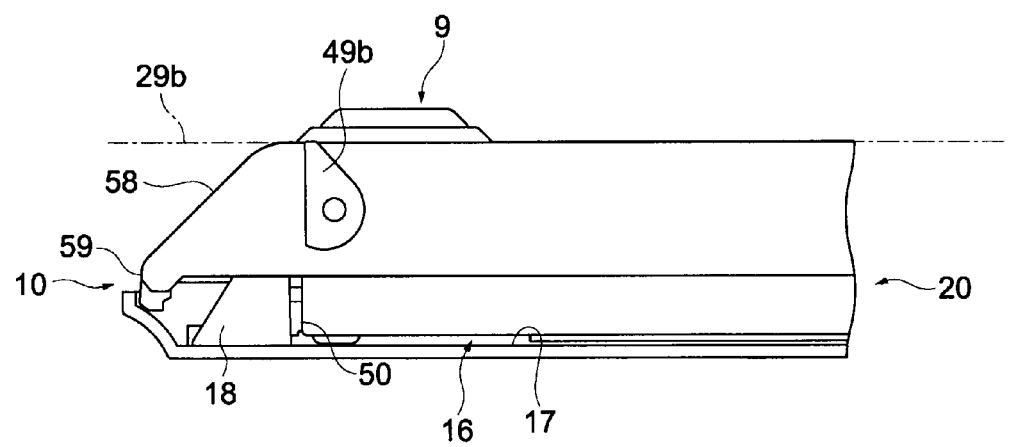
FIG.19

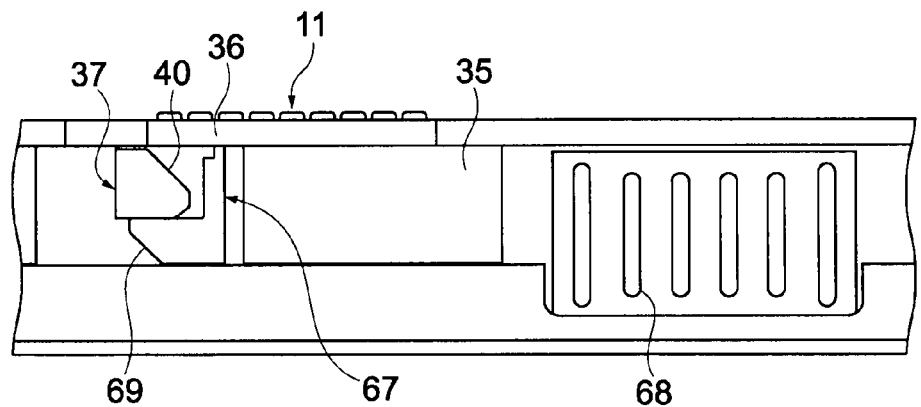
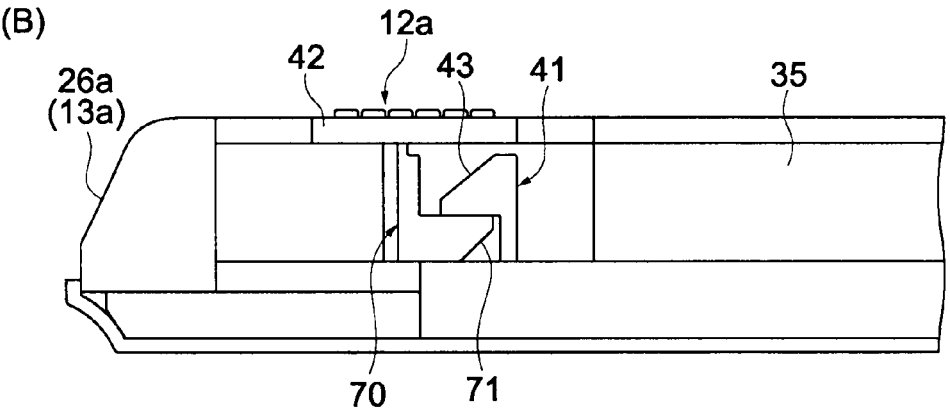
FIG.21

(A)
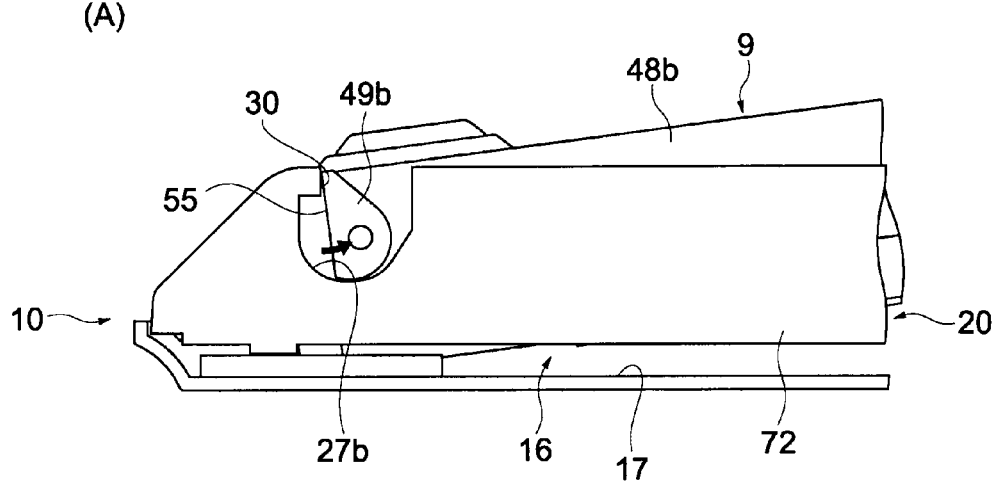
(B)
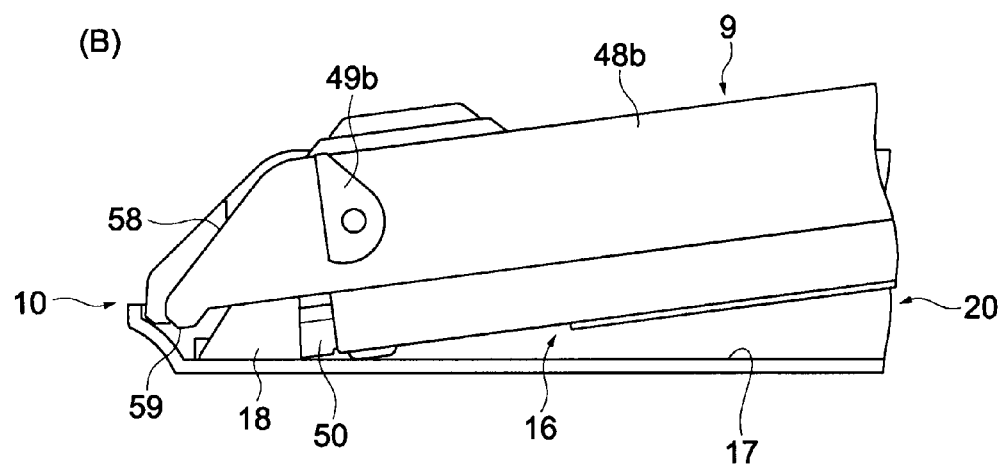
FIG.22

(A)
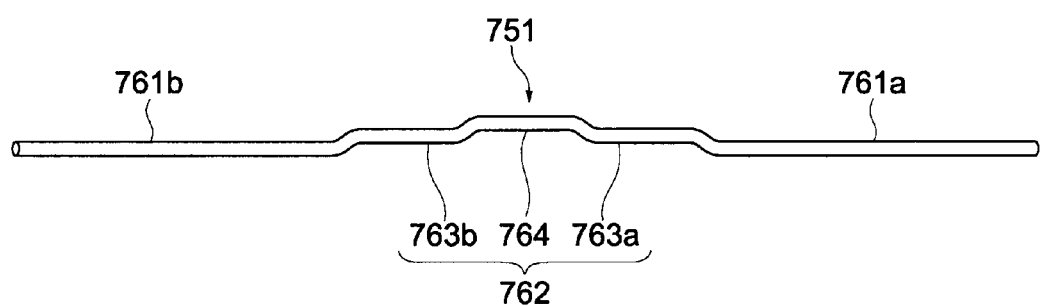
(B)
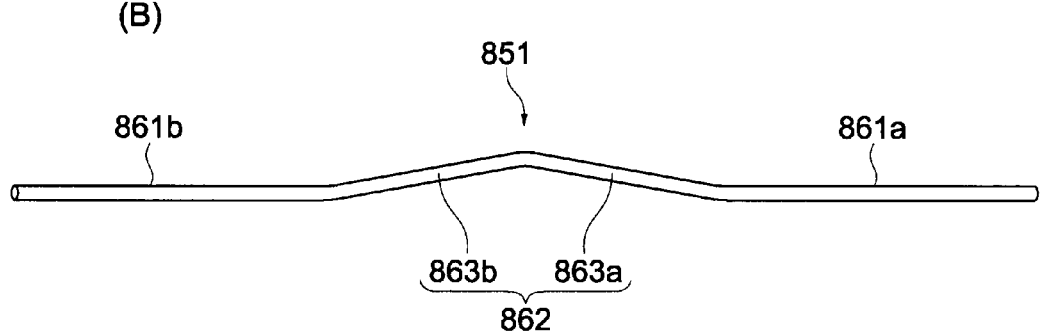
FIG.28

US 8,917,517 B2

ELECTRONIC APPARATUS, BATTERY PACK, AND BATTERY PACK MOUNTING METHOD

TECHNICAL FIELD

The present invention relates to an electronic apparatus such as a laptop personal computer, and a battery pack that can be detached from the electronic apparatus.

BACKGROUND ART

In recent years, battery packs that can be detached from a main body of a laptop personal computer are being used. In a laptop personal computer disclosed in Patent Document 1, for example, a battery mounting portion from which a battery pack can be detached is provided on a back surface of a main body (see FIGS. 1, 2, etc. of Patent Document 1).

On the other hand, laptop personal computers are becoming thinner and thinner. For example, in Patent Document 2, a built-in battery is set below a palm rest portion on the front side (front side from user) of a laptop personal computer instead of being set below a key mode module. Specifically, the built-in battery is incorporated next to a pointing device on a front side of a computer main body, and this promotes the thinning of the computer main body (see FIGS. 1, 2, etc. of Patent Document 2).

Patent Document 1: Japanese Patent Application Laid-open No. 2007-115091
Patent Document 2: Japanese Patent Application Laid-open No. 2009-104665

DISCLOSURE OF THE INVENTION

Problem to be Solved by the Invention

However, when additionally thinning the laptop personal computer of Patent Document 2, the built-in battery is also thinned, with the result that a capacity of the built-in battery becomes small. As a result, capacities of other members such as a pointing device become small. For increasing capacity of the thinned built-in battery, an area of the built-in battery needs to be increased, thus causing an interference with other members such as a pointing device.

In view of the circumstances as described above, an object of the present invention is to provide a battery pack that can be thinned without causing an interference with other members such as a pointing device and reducing a capacity, an electronic apparatus equipped with the battery pack, and a battery pack mounting method.

Means for Solving the Problem

For attaining the object described above, according to an embodiment of the present invention, there is provided an electronic apparatus including a main body and a battery pack.

The main body includes a mounting portion.

The battery pack is mounted to the mounting portion and includes a secondary battery, a control board, a first casing portion, and a second casing portion.

The secondary battery supplies power to the main body.

The control board is electrically connected to the secondary battery.

The first casing portion has a first thickness, the first casing portion having the secondary battery incorporated therein.

The second casing portion has a second thickness smaller than the first thickness, the second casing portion having the control board incorporated therein.

The battery pack mounted to the electronic apparatus includes the first casing portion into which the secondary battery is incorporated and the second casing portion into which the control board is incorporated. The thickness of the second casing portion is smaller than that of the first casing portion. As a result, by increasing an area of the first casing portion when thinning the battery pack, for example, the secondary battery having a large area can be incorporated, and the capacity can be prevented from becoming smaller. In addition, by appropriately setting an arrangement position of the second casing portion having a small thickness, the battery pack can be mounted to the electronic apparatus without causing an interference with other members such as a pointing device.

The battery pack may include a plurality of first casing portions. In this case, the plurality of first casing portions and the second casing portion may be arranged linearly in a first direction such that the second casing portion is provided between the plurality of first casing portions.

By providing the plurality of first casing portions, it becomes possible to incorporate a plurality of secondary batteries and prevent the capacity from becoming smaller. Moreover, the first casing portions and the second casing portion can be arranged as appropriate as described above in accordance with arrangement positions of other members of the electronic apparatus.

The electronic apparatus may further include a display portion connected to the main body.

In this case, the main body may include a front side, a keyboard, a plurality of palm rest portions, a pointing device, and a back side.

The keyboard is provided on the front side.

The plurality of palm rest portions are adjacent to the keyboard on a side opposite to a side on which the display portion is connected.

The pointing device is aligned linearly with the plurality of palm rest portions in the first direction such that the pointing device is placed between the plurality of palm rest portions.

On the back side, the mounting portion is provided.

Further, the battery pack may be mounted to the mounting portion on the back side such that the plurality of first casing portions are arranged at positions respectively corresponding to the plurality of palm rest portions and the second casing portion is arranged at a position corresponding to the pointing device.

For example, in a general laptop personal computer, a pointing device is arranged on the front side (front side from user) in many cases. The thinned battery pack of this embodiment can also be mounted to such a laptop personal computer on the front side without causing an interference with a pointing device, for example.

The main body may include the mounting portion including a mounting surface, a pair of side walls, a pair of notched portions, a protrusion, and an engagement hole.

The mounting surface is opposed to the battery pack on the back side.

The pair of side walls face each other in the first direction and sandwich the mounting portion.

The pair of notched portions are provided on the pair of side walls, respectively.

The protrusion protrudes from the mounting surface.

The engagement hole is provided on the protrusion and opens in a second direction intersecting the first direction in a planar direction of the mounting surface.

Further, the battery pack may include a pair of side surfaces, a pair of first bosses, and a second boss.

The pair of side surfaces are opposed to the pair of side walls, respectively, in the first direction.

The pair of first bosses respectively protrude from the pair of side surfaces in the first direction and engage with the pair of notched portions, respectively, the pair of first bosses capable of being mounted on the pair of side walls at a time the battery pack is mounted.

The second boss protrudes in the second direction and engages with the engagement hole at a time the pair of first bosses engage with the pair of notched portions.

In the electronic apparatus described above, the second boss of the battery pack engages with the engagement hole of the protrusion protruding from the mounting surface. In this embodiment, the pair of first bosses provided on the pair of side surfaces of the battery pack can be mounted on the pair of side walls of the main body, and the first bosses are moved along the side walls. In addition, the engagement hole engages with the second boss when the first bosses engage with the pair of notched portions formed on the side walls. As a result, positioning of the second boss for engaging the second boss with the engagement hole becomes simple, and the thinned battery pack can be mounted to the mounting portion with ease.

The battery pack may include a cover that covers the protrusion when the battery pack is mounted.

For example, when the battery pack is moved on the mounting surface for engaging the second boss with the engagement hole of the protrusion, the cover may come into contact with the protrusion and the second boss may not be able to engage with the engagement hole. In this embodiment, however, since the pair of first bosses are mounted on the pair of side walls, the cover is positioned above the mounting surface. As a result, it becomes possible to prevent the cover from coming into contact with the protrusion, smoothly engage the second boss with the engagement hole, and cover the protrusion with the cover.

The pair of notched portions may each include a contact portion that comes into contact with the corresponding one of the pair of first bosses for moving the battery pack in a direction in which the second boss comes out of the engagement hole at a time the battery pack is turned to be removed from the mounting portion.

In a case where the battery pack is turned to be removed from the mounting portion, for example, the second boss engaging with the engagement hole might get caught in the engagement hole in a rotational direction. In this embodiment, however, the first bosses come into contact with the contact portions of the notched portions when the battery pack is turned to thus move the battery pack in the direction in which the second boss comes out of the engagement hole. As a result, it is possible to prevent the second boss from getting caught in the engagement hole in the rotational direction.

The battery pack may include a reinforcement member.

The reinforcement member includes a plurality of first reinforcement portions and a second reinforcement portion.

The plurality of first reinforcement portions are provided in a direction in which the plurality of first casing portions and the second casing portion are arranged.

The second reinforcement portion includes a plurality of first coupling portions and is arranged between the plurality of first reinforcement portions.

The plurality of first coupling portions are respectively coupled to the plurality of first reinforcement portions in a direction different from the direction in which the plurality of first casing portions and the second casing portion are arranged.

Due to the reinforcement member, the thinned battery pack can be reinforced in the direction in which the first casing portions and the second casing portion are arranged. Moreover, due to the first coupling portions of the second reinforcement member, the battery pack can also be reinforced in a twisting direction about the direction in which the first casing portions and the second casing portion are arranged.

The plurality of first reinforcement portions may respectively come into contact with the plurality of first casing portions.

In this case, the second reinforcement portion may include a second coupling portion and be brought into contact with the second casing portion.

The second coupling portion is coupled with the plurality of first coupling portions and provided in the direction in which the plurality of first casing portions and the second casing portion are arranged.

Because the thickness of the second casing portion is smaller than that of the first casing portion, the second casing portion is apt to be deformed as compared to the first casing portion. By bringing the second reinforcement portion having the first coupling portions and the second coupling portion into contact with the second casing portion, the battery pack can be reinforced effectively.

According to an embodiment of the present invention, there is provided a battery pack mounting method including mounting, on a pair of side walls provided on a main body such that a mounting portion on which a battery pack is mounted is sandwiched between the pair of side walls, a pair of first bosses respectively provided on a pair of side surfaces of the battery pack.

The pair of first bosses are moved along the pair of side walls.

The battery pack is turned while causing the pair of first bosses to engage with a pair of notched portions respectively provided on the pair of side walls.

While engaging a second boss of the battery pack with an engagement hole of a protrusion protruding from a mounting surface of the mounting portion, that opens in a direction along the pair of side walls, the protrusion is covered with a cover of the battery pack.

As a result, the thinned battery pack can be attached easily to the mounting portion.

According to an embodiment of the present invention, there is provided a battery pack including a secondary battery, a control board, a first casing portion, and a second casing portion.

The control board is electrically connected to the secondary battery.

The first casing portion has a first thickness, the first casing portion having the secondary battery incorporated therein.

The second casing portion has a second thickness smaller than the first thickness, the second casing portion having the control board incorporated therein.

According to another embodiment of the present invention, there is provided a battery pack including a secondary battery, a control board, two first casing portions, and a second casing portion.

The control board is electrically connected to the secondary battery.

The two first casing portions each have a first thickness, at least one of the first casing portions having the secondary battery incorporated therein.

The second casing portion has a second thickness smaller than the first thickness, the second casing portion having the control board incorporated therein and being provided between the two first casing portions.

As a result, by appropriately setting the arrangement position of the second casing portion having a small thickness, the battery pack can be mounted to the electronic apparatus without causing an interference with other members such as a pointing device.

The battery pack may further include a connector portion that is provided in the second casing portion and electrically connected to the control board.

According to another embodiment of the present invention, there is provided a battery pack that is mounted on a back side of a pointing device of a laptop personal computer that is provided with the pointing device on a front side, the battery pack including a secondary battery and a casing.

The casing includes two battery accommodating portions and a concave portion.

At least one of the two battery accommodating portions has the secondary battery incorporated therein.

The concave portion is provided between the two battery accommodating portions and corresponds to a portion on the back side of the pointing device.

In the battery pack, the concave portion corresponding to the portion on the back side of the pointing device is provided. As a result, even when a substrate or the like for operating a pointing device is provided on the back side of the pointing device, for example, the substrate or the like can be arranged in the concave portion. Therefore, the battery pack of this embodiment can be mounted on the back side of the pointing device without causing an interference with the pointing device.

The battery pack may further include a control board electrically connected to the secondary battery. In this case, the control board is incorporated in the concave portion of the casing. Moreover, the battery pack may further include a connector portion that is electrically connected to the control board.

Effect of the Invention

As described above, according to the present invention, a battery pack that can be thinned without causing an interference with other members such as a pointing device and reducing a capacity, an electronic apparatus equipped with the battery pack, and a battery pack mounting method can be provided.

BRIEF DESCRIPTION OF DRAWINGS

[FIG. 8] Front views showing a rear surface in a second direction (X direction shown in FIG. 4), the rear surface being located on a rear side of the mounting portion shown in FIG. 4.

[FIG. 15] Front views showing a rear surface on a rear side of the battery pack shown in FIG. 9.

[FIG. 19] Side views seen from the side wall side showing an operation of mounting the battery pack shown in FIG. 16.

[FIG. 21] Front views showing a rear surface of a main body in a case where the battery pack shown in FIG. 16 is mounted.

[FIG. 22] Side views seen from the side wall side showing an operation of removing the battery pack shown in FIG. 3.

[FIG. 28] Diagrams showing modified examples of the reinforcement member shown in FIG. 14.

BEST MODES FOR CARRYING OUT THE INVENTION

Hereinafter, embodiments of the present invention will be described with reference to the drawings.

An electronic apparatus according to an embodiment of the present invention will now be described. In this embodiment, a laptop personal computer will be taken as an example of the electronic apparatus.

(Structure of Electronic Apparatus)

Figure 1:
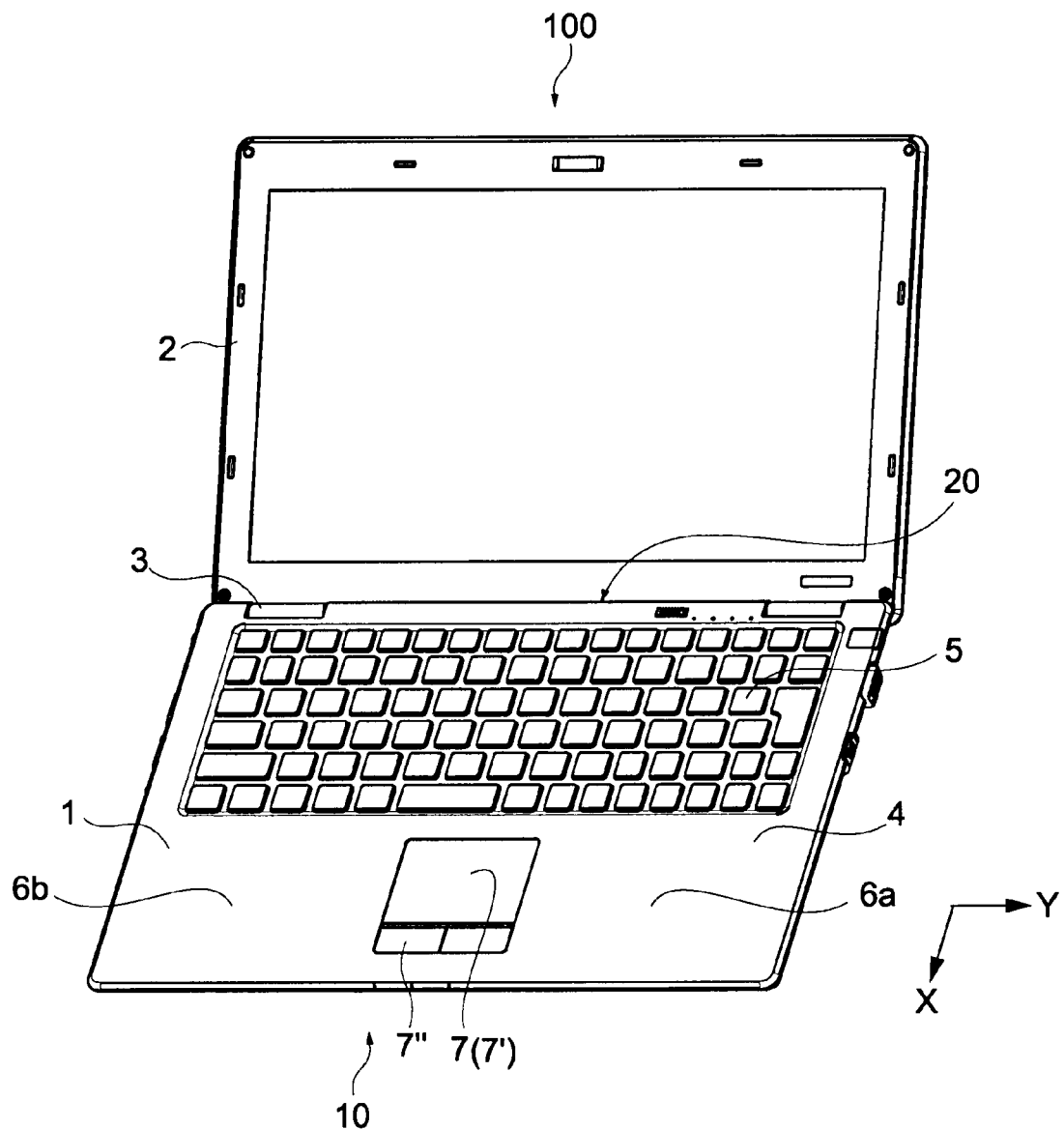
[FIG. 1] A schematic perspective view showing a state where an electronic apparatus according to an embodiment of the present invention is opened.
Figure 2:
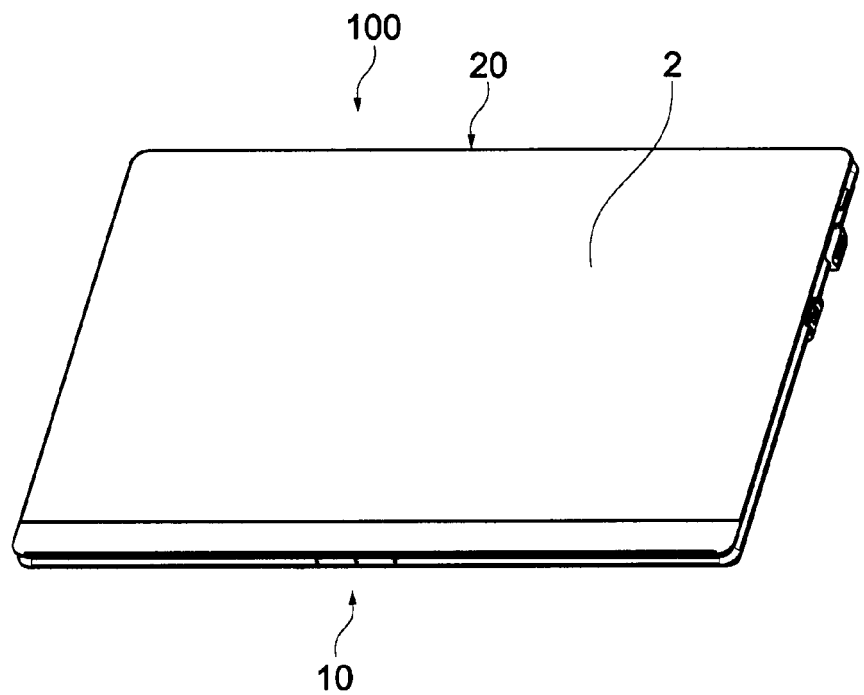
[FIG. 2] A schematic perspective view showing a state where the electronic apparatus shown in FIG. 1 is closed.

FIG. 1 is a schematic perspective view showing a state where the electronic apparatus of this embodiment is opened. FIG. 2 is a schematic perspective view showing a state where the electronic apparatus shown in FIG. 1 is closed. The electronic apparatus 100 includes a main body 1 and a display portion 2 connected to the main body 1. The main body 1 and the display portion 2 are connected via a hinge 3, and the display portion 2 can be opened/closed (foldable) with respect to the main body 1 as shown in FIGS. 1 and 2. A side that faces the display portion 2 at a time the electronic apparatus 100 is closed is a front side 4 of the main body 1.

As shown in FIG. 1, on the front side 4 of the main body 1, a keyboard 5, palm rest portions 6a and 6b, and a pointing device 7 arranged between the palm rest portions 6a and 6b are provided. Regarding the keyboard 5, the palm rest portions 6a and 6b and the pointing device 7 are located on the other side of the side on which the display portion 2 is connected. Hereinafter, the side on which the display portion 2 is connected will be referred to as rear side 20, and the other side will be referred to as front side 10.

The palm rest portions 6a and 6b and the pointing device 7 are adjacent to the keyboard 5 and arranged linearly in a first direction (Y direction shown in FIG. 1) such that the pointing device 7 is positioned at substantially the center of the front side 10 on the front side 4.

In this embodiment, a touchpad 7' is provided as the pointing device 7, and a click button 7" is provided adjacent to the touchpad 7'. Other devices such as a trackball may also be used as the pointing device 7.

Figure 3:
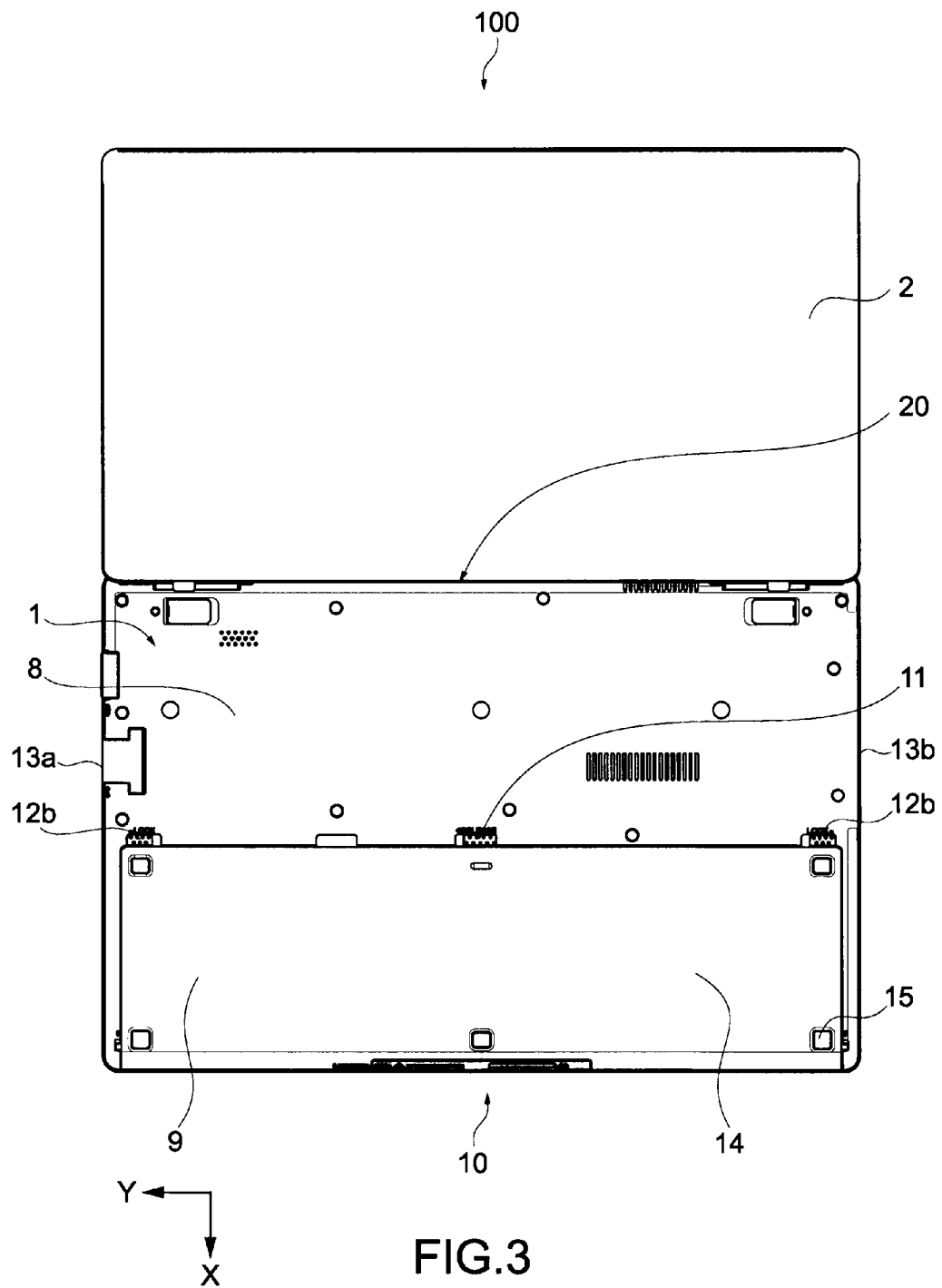
[FIG. 3] A schematic bottom view of the electronic apparatus shown in FIG. 1.

FIG. 3 is a schematic bottom view of the electronic apparatus 100 shown in FIG. 1. As shown in FIG. 3, a battery pack 9 is mounted on a back side 8 of the main body 1. The battery pack 9 is mounted on the front side 10 of the main body 1 on the back side 8 thereof. In other words, the battery pack 9 is mounted at a position corresponding to the palm rest portions 6a and 6b and the pointing device 7 provided on the front side 4 of the main body 1.

On the back side 8 of the main body 1, a release portion 11 that engages with the mounted battery pack 9, and lock portions 12a and 12b are provided. The release portion 11 is provided at substantially the center of the back side 8 of the main body 1, and the lock portions 12a and 12b are respectively provided in the vicinity of side surfaces 13a and 13b of the main body 1. On a back surface 14 of the battery pack 9, a plurality of cushion portions 15 that function as cushions at a time the electronic apparatus 100 is placed on a desk or the like are provided.

Figure 4:
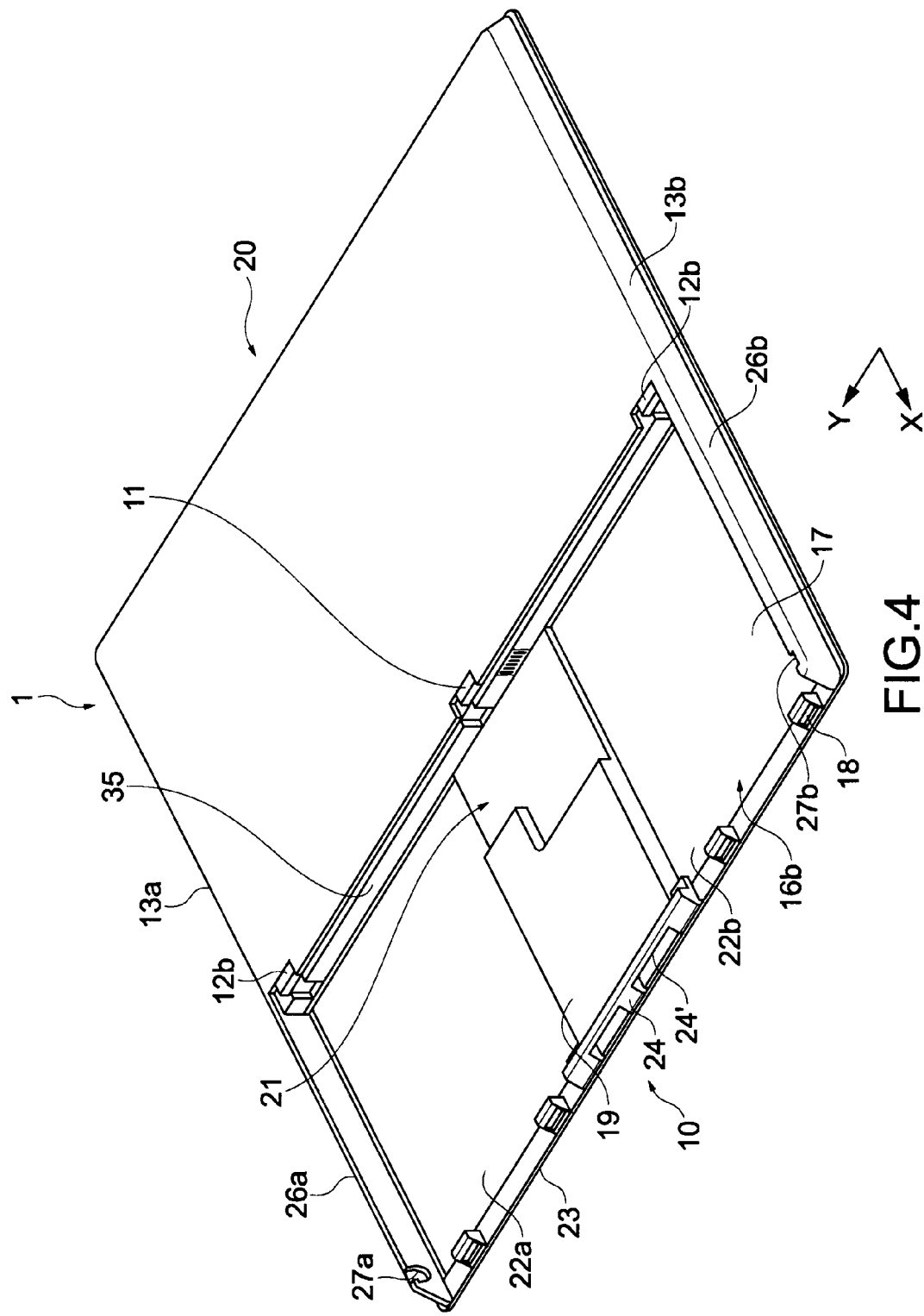
[FIG. 4] A schematic perspective view showing a state where a battery pack is removed from the back side of the main body shown in FIG. 3.

FIG. 4 is a schematic perspective view showing a state where the battery pack 9 is removed from the back side 8 of the main body 1. An illustration of the display portion 2 will be omitted as shown in FIG. 4 in descriptions below.

As shown in FIG. 4, a mounting portion 16 is provided on the back side 8 of the main body 1, and the battery pack 9 is mounted to the mounting portion 16. The mounting portion 16 includes a mounting surface 17 that faces the battery pack 9 when the battery pack 9 is mounted. A plurality of protrusions 18 protruding from the mounting surface 17 are provided on the front side 10 of the mounting surface 17.

The mounting portion 16 includes a center portion 21 positioned at substantially the center of the mounting surface 17 and side portions 22a and 22b sandwiching the center portion 21. The center portion 21 and the side portions 22a and 22b are aligned linearly in a first direction (Y direction shown in FIG. 4), and a position of the center portion 21 corresponds to that of the pointing device 7 provided on the front side 4 of the main body 1. Further, positions of the two side portions 22a and 22b respectively correspond to those of the palm rest portions 6a and 6b provided on the front side 4. A convex portion 19 is provided at the center portion 21.

Further, as shown in FIG. 4, a card slot 24 is provided at an edge 23 on the front side 10 of the main body 1. The card slot 24 is provided at substantially the center of the edge 23 on the front side 10 and includes two slot holes 24' that are arranged laterally. Via the card slot 24, memory sticks and memory cards such as an SD card are inserted into the main body 1. The number and arrangement of the slot holes 24' are not particularly limited. In this embodiment, the two slot holes 24' that are arranged laterally are advantageous regarding thinning of the main body 1.

A card accommodating portion (not shown) for accommodating a card inserted via the card slot 24, a substrate (not shown) for operating the pointing device 7 on the front side 4, and the like are arranged inside the convex portion 19 provided at the center portion 21 of the mounting surface 17. It should be noted that the card slot 24 may be provided at other portions of the main body 1 instead of at substantially the center of the edge on the front side 10. In this case, the substrate of the pointing device 7 and the like are provided inside the convex portion 19, but the card accommodating portion described above is not.

The mounting portion 16 is sandwiched between a pair of side walls 26a and 26b that are opposed to each other in the first direction (Y direction) as shown in FIG. 4. In this embodiment, the mounting portion 16 is provided across from the side surface 13a of the main body 1 to the side surface 13b in the first direction (Y direction). Therefore, portions of the side surfaces 13a and 13b that correspond to a position at which the mounting portion 16 is provided become the pair of side walls 26a and 26b. The pair of side walls 26a and 26b extend in a second direction (X direction shown in FIG. 4) orthogonal to the first direction as a surface direction of the mounting surface 17.

Figure 5:
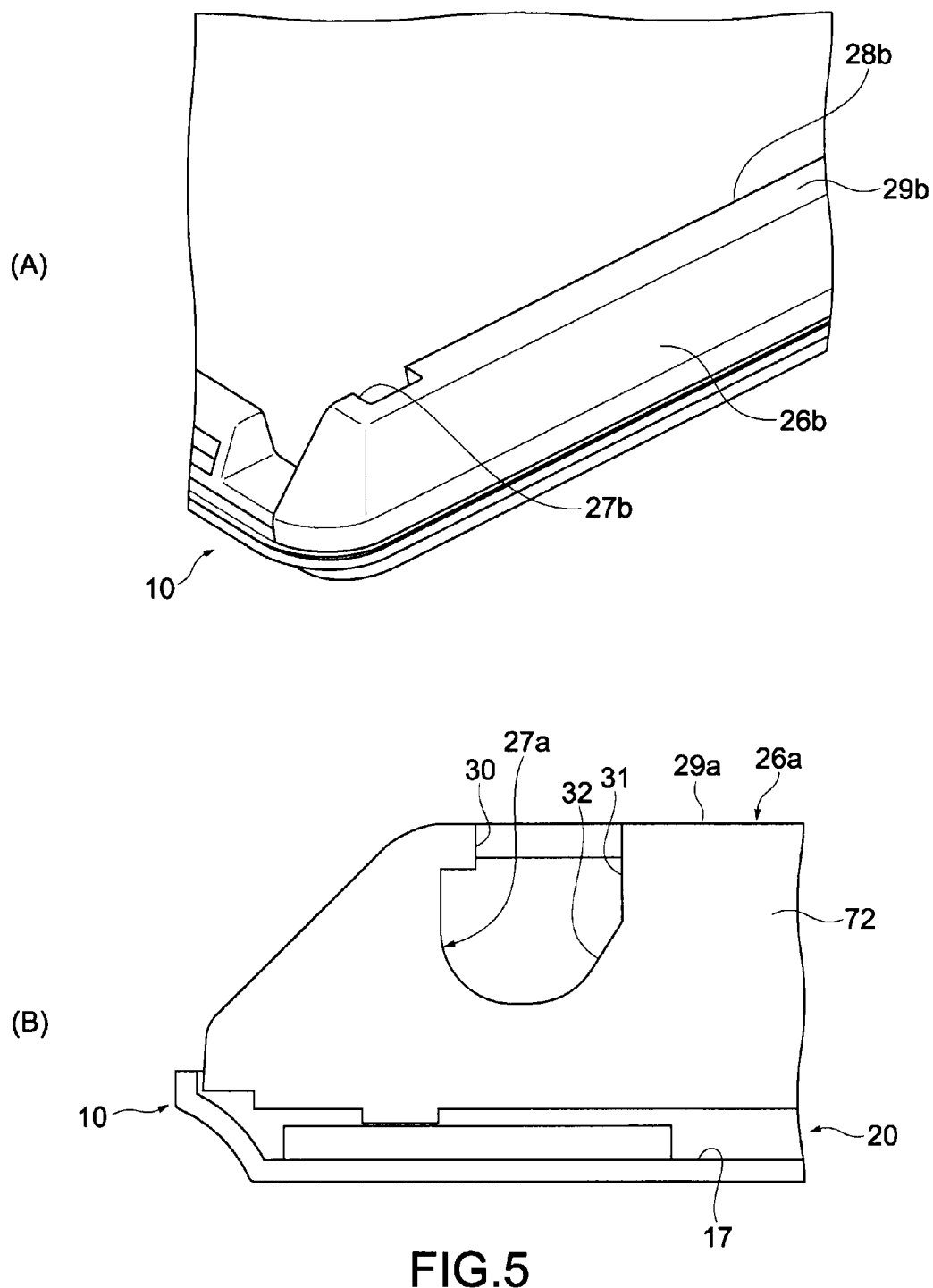
[FIG. 5] Partially-enlarged diagrams schematically showing a front side of a pair of side walls shown in FIG. 4.

FIG. 5 are partially-enlarged diagrams schematically showing the front side 10 of the pair of side walls 26a and 26b. FIG. 5(A) is an enlarged perspective view of the front side 10 of the side wall 26b shown in FIG. 4, and FIG. 5(B) is a side view of the front side 10 of the side wall 26a shown in FIG. 4 seen from the mounting portion 16 side in the first direction (Y direction).

As shown in FIGS. 5(A) and 5(B), on the front side 10 of the pair of side walls 26a and 26b, notched portions 27a and 27b are provided. The pair of notched portions 27a and 27b are opened toward upper surfaces 29a and 29b of the side walls 26a and 26b that correspond to the back side 8 of the main body 1. Further, the pair of notched portions 27a and 27b are also opened toward inner surfaces 28a and 28b on the mounting portion 16 side of the side walls 26a and 26b. In this embodiment, a plate 72 on which a notched portion having the same shape as the notched portions 27a and 27b is formed is provided on the inner surfaces 28a and 28b.

As shown in FIG. 5(B), the shape of the notched portion 27a is substantially a U-shape. On the front side 10 of the notched portion 27a, a contact portion 30 that comes into contact with a first boss of the battery pack 9 to be described later is provided. The contact portion 30 is provided on the upper surface 29a side of the side wall 26a and protrudes from the front side 10 toward the rear side 20. On the upper surface 29a side of the side wall 26a, that is on the rear side 20 of the notched portion 27a, a flat surface portion 31 is provided in a direction extending from the upper surface 29a to the mounting surface 17. From the flat surface portion 31, a tapered surface 32 extending obliquely toward the mounting surface 17 is provided. The notched portion 27b as the other notched portion provided on the side wall 26b also has the same shape.

Figure 6:
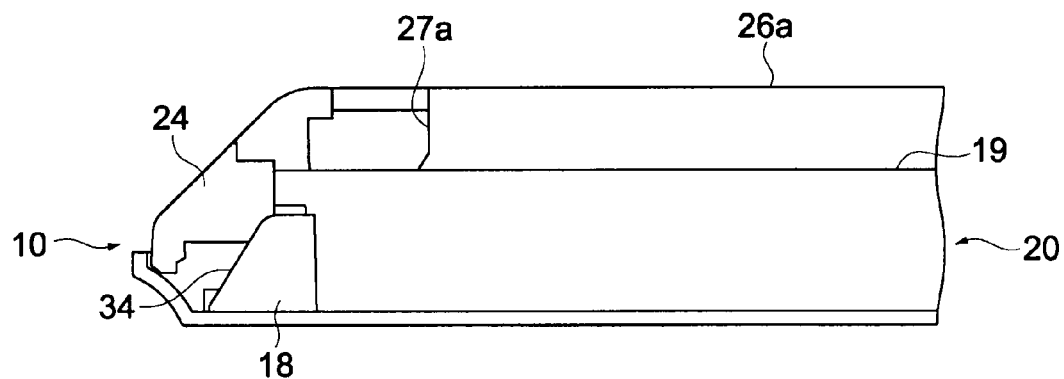
[FIG. 6] A side view of a front side of a mounting portion shown in FIG. 4 seen from the side wall side.
Figure 7:
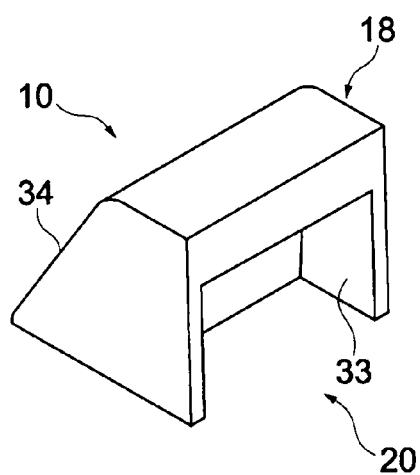
[FIG. 7] A schematic perspective view of a protrusion shown in FIG. 6.

FIG. 6 is a side view of the front side 10 of the mounting portion 16 shown in FIG. 4 seen from the side wall 26b side. In FIG. 6, to help understand the description, the illustration of the side wall 26b is omitted. Therefore, in FIG. 6, the card slot 24 described above and the side wall 26a on the other side of the side wall 26b are illustrated. FIG. 7 is a schematic perspective view of the protrusion 18 shown in FIG. 6.

As shown in FIG. 6, the protrusions 18 protruding from the mounting surface 17 are arranged linearly in the first direction (Y direction shown in FIG. 4) on the front side 10 of the main body 1. Moreover, as shown in FIG. 7, the protrusions 18 are each provided with an engagement hole 33. The engagement hole 33 is opened from the front side 10 shown in FIG. 6 toward the rear side 20 in the second direction (X direction shown in FIG. 4) as a direction in which the side walls 26a and 26b extend.

Although a tapered portion 34 is formed on the front side 10 of the protrusions 18 in this embodiment, the shape of the protrusions 18 is not particularly limited. Moreover, the shape of the opening of the engagement hole 33 is also not particularly limited, and examples of the shape of the opening include a rectangle, a circle, and a polygon.

FIG. 8 are front views showing a rear surface 35 in the second direction (X direction shown in FIG. 4), the rear surface 35 being located on the rear side 20 of the mounting portion 16 shown in FIG. 4. On the rear surface 35, the release portion 11 described above and the lock portions 12a and 12b are provided.

As shown in FIG. 8(A), the release portion 11 provided at substantially the center of the rear surface 35 includes a release lever 36 and a release boss 37. The release lever 36 and the release boss 37 can be moved integrally. The release lever 36 and the release boss 37 are biased to the right-hand side shown in FIG. 8(A) by an elastic member such as a spring (not shown) provided inside the main body 1 and can be manually moved in the left-hand direction. A tapered surface 40 is provided in the release boss 37, and the tapered surface 40 is provided on the side toward which the release boss 37 is biased (right-hand side).

Further, as shown in FIG. 8(A), a connector potion 39 is provided in the vicinity of the release portion 11, and power is supplied to the electronic apparatus 100 when the connector portion of the battery pack 9 is connected to the connector potion 39.

As shown in FIG. 8(B), the lock portion 12a provided in the vicinity of the side surface 13a of the main body 1 includes a lock boss 41 including a tapered surface 43, and a lock lever 42. The lock boss 41 and the lock lever 42 can be moved integrally. The lock boss 41 and the lock lever 42 are moved manually to the left- and right-hand sides shown in FIG. 8(B). The lock portion 12b provided in the vicinity of the side surface 13b as the other side surface has the same structure as the lock portion 12a.

Figure 9:
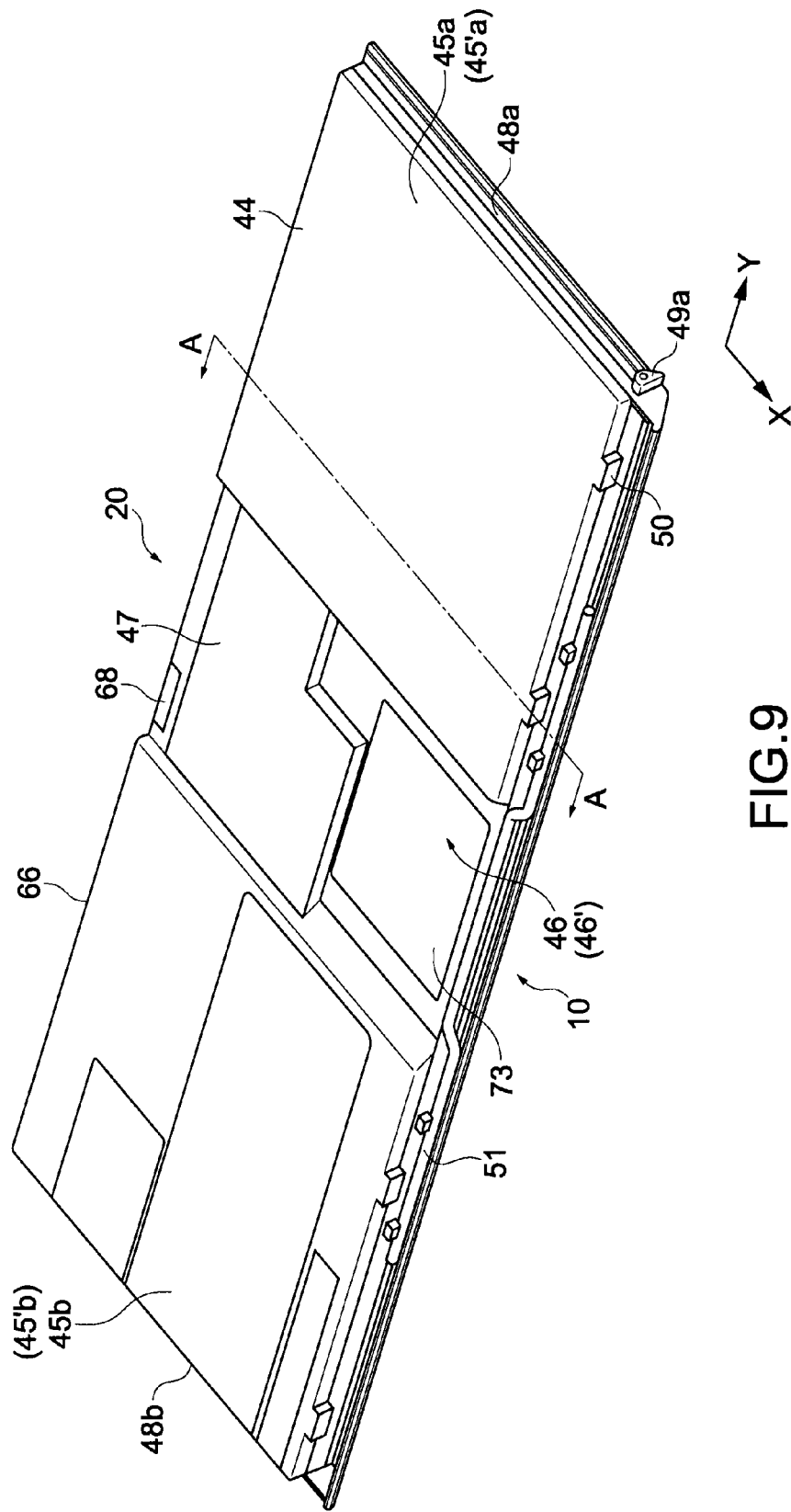
[FIG. 9] A schematic perspective view showing a battery pack according to an embodiment of the present invention.

FIG. 9 is a schematic perspective view showing the battery pack 9 of this embodiment. FIG. 9 shows the battery pack 9 seen from a lower surface 44 side opposed to the mounting surface 17 at a time the battery pack 9 is mounted to the mounting portion 16 of the main body 1. The front side 10 of the battery pack 9 shown in FIG. 9 is a side that becomes the front side 10 of the main body 1 when mounted to the mounting portion 16.

As shown in FIG. 9, the battery pack 9 has a structure of a casing and includes first casing portions 45a and 45b and a second casing portion 46 sandwiched between the first casing portions 45a and 45b. The first casing portions 45a and 45b and the second casing portion 46 are arranged linearly in the Y direction shown in FIG. 9.

Comparing the thickness of the second casing portion 46 with that of the first casing portions 45a and 45b, the thickness of the second casing portion 46 is smaller. Therefore, as shown in FIG. 9, practically the center of the battery pack 9 at which the second casing portion 46 is provided has a concave shape. In other words, the battery pack 9 of this embodiment includes a concave portion 46' corresponding to the second casing portion 46. The second casing portion 46 having a small thickness includes an accommodating portion 47 whose thickness is smaller than that of the first casing portions 45a and 45b and a space portion 73 whose thickness is smaller than that of the accommodating portion 47.

Further, the battery pack 9 includes a pair of side surfaces 48a and 48b. The pair of side surfaces 48a and 48b extend in a direction orthogonal to a direction in which the first casing portions 45a and 45b and the second casing portion 46 are arranged (X direction shown in FIG. 9). On the front side 10 of the side surface 48a, a first boss 49a is provided. Though not shown in FIG. 9, also on the side surface 48b, a first boss 49b that pairs with the first boss 49a is provided.

On the front side 10 of the battery pack 9, a plurality of second bosses 50 that protrude in the extension direction of the pair of side surfaces 48a and 48b are provided. Further, on the front side 10 of the battery pack 9, a bar-type reinforcement member 51 for reinforcing the battery pack 9 is provided.

Figure 10:
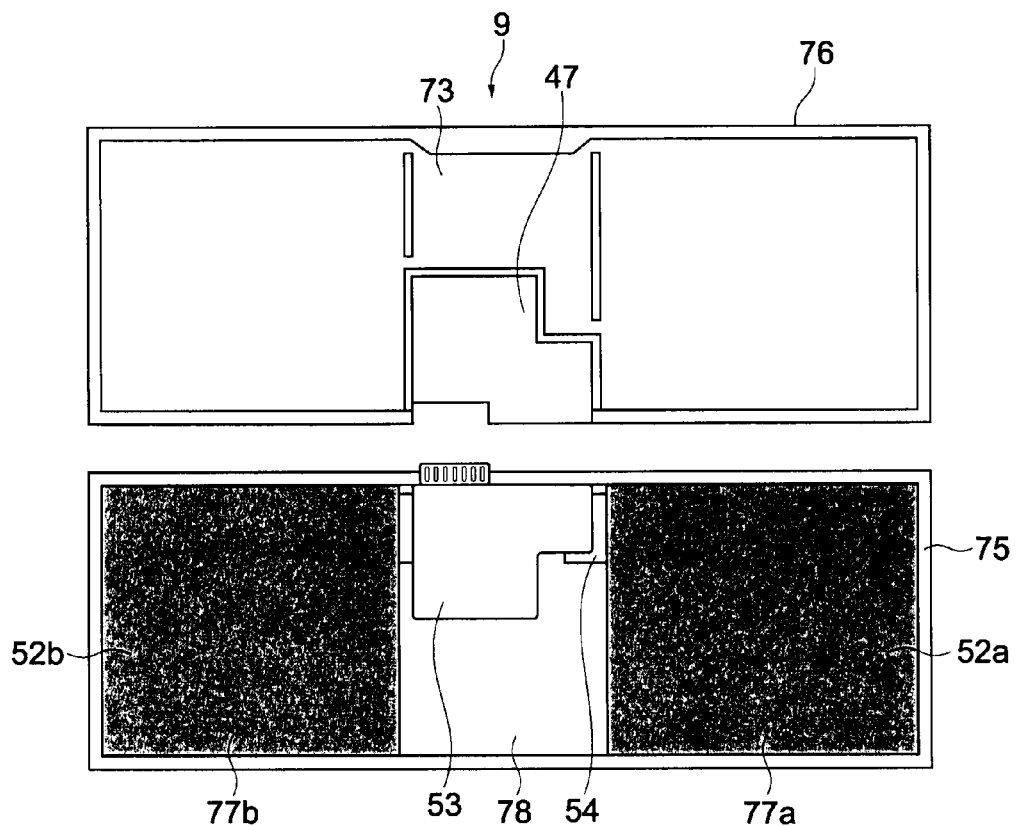
[FIG. 10] A schematic perspective view showing a state where the battery pack shown in FIG. 9 is opened.

FIG. 10 is a schematic perspective view showing a state where the battery pack 9 shown in FIG. 9 is opened. The battery pack 9 of this embodiment is constituted of an accommodating plate 75 and a cover plate 76 as shown in FIG. 10(A). The accommodating plate 75 includes areas 77a and 77b as insides of the first casing portions 45a and 45b and an area 78 as an inside of the second casing portion 46. A center portion of the cover plate 76 that corresponds to the area 78 can be divided into the accommodating portion 47 and the space portion 73 shown in FIG. 9.

Accommodated in the areas 77a and 77b for supplying power to the main body 1 are secondary batteries 52a and 52b, the examples of which include a lithium-ion battery and a lithium polymer battery. Accommodated in the area 78 are a control board 53 for controlling power supply from the secondary batteries 52a and 52b and a wiring sheet metal 54 electrically connected to the secondary batteries 52a and 52b and the control board 53.

Specifically, the secondary batteries 52a and 53b are incorporated into the first casing portions 45a and 45b, respectively, when the cover plate 76 is closed. In other words, the first casing portions 45a and 45b of this embodiment correspond to battery accommodating portions 45'a and 45'b.

The control board 53 and the wiring sheet metal 54 are incorporated in the second casing portion 46. In other words, the control board 53 and the wiring sheet metal 54 are accommodated inside a portion corresponding to the concave portion 46' of the battery pack 9. As shown in FIG. 10, the control board 53 and the wiring sheet metal 54 are accommodated inside the accommodating plate 75 so as to be incorporated in the accommodating portion 47 of the second casing portion 46.

As described above, the secondary batteries 52a and 52b are incorporated in the first casing portions 45a and 45b (battery accommodating portions 45'a and 45'b), and the control board 53 and the wiring sheet metal 54 are incorporated in the second casing portion 46 (concave portion 46'). Accordingly, the thickness of the second casing portion 46 can be made smaller than that of the first casing portions 45a and 45b. Therefore, by increasing the areas of the first casing portions 45a and 45b of the thinned battery pack 9, for example, it is possible to incorporate the secondary batteries 52a and 52b having large areas and prevent the capacity of the battery pack 9 from becoming smaller. Moreover, by providing the plurality of first casing portions 45a and 45b as in this embodiment, the plurality of secondary batteries 52a and 52b can be incorporated therein. In addition, even when the areas of the first casing portions 45a and 45b are increased as described above or the number of first casing portions is increased, by appropriately setting the arrangement position of the second casing portion 46 having a small thickness, the battery pack 9 can be mounted to the electronic apparatus 100 without causing an interference with other members such as the pointing device 7.

In this embodiment, the first casing portions 45a and 45b and the second casing portion 46 are arranged linearly such that the second casing portion 46 is sandwiched between the first casing portions 45a and 45b. As shown in FIG. 3, the battery pack 9 is mounted to a portion corresponding to the back side 8 of the linearly-aligned palm rest portions 6a and 6b and pointing device 7 provided on the front side 4 of the main body 1.

The first casing portions 45a and 45b are arranged at positions respectively corresponding to the side portions 22a and 22b of the mounting surface 17, that is, the palm rest portions 6a and 6b provided on the front side 4. The second casing portion 46 is arranged at a position corresponding to the center portion 21 of the mounting portion 16, that is, the pointing device 7 provided on the front side 4. As shown in FIG. 4, the convex portion 19 is provided at the center portion 21 of the mounting portion 16.

Specifically, in this embodiment, the second casing portion 46 having a small thickness is arranged at a position corresponding to the pointing device 7 and the card slot 24 provided in the main body 1. In other words, the concave portion 46' of the battery pack 9 is provided so as to correspond to the convex portion 19 on the back side of the pointing device 7. Further, the battery pack 9 is mounted such that the convex portion 19 is arranged at the concave portion 46'. With this structure, the thinned battery pack 9 can be mounted on the front side 10 of the main body 1 to thus realize thinning of the main body 1.

Furthermore, in this embodiment, the second casing portion 46 is provided with the accommodating portion 47 and the space portion 73 having a smaller thickness than the accommodating portion 47. When the battery pack 9 is mounted to the mounting portion 16, the convex portion 19 at the center portion 21 of the mounting portion 16 is arranged at a position corresponding to the space portion 73. With this structure, the accommodating portion 47 of the second casing portion 46 and the convex portion 19 of the mounting portion 16 are arranged without overlapping each other, to thus additionally realize thinning of the main body 1.

In a general laptop personal computer, a pointing device is arranged at the center on the front side (front side from user) in many cases. As described above, the thinned battery pack 9 of this embodiment can be mounted to such a laptop personal computer on the front side without causing an interference with the pointing device.

Figure 11:
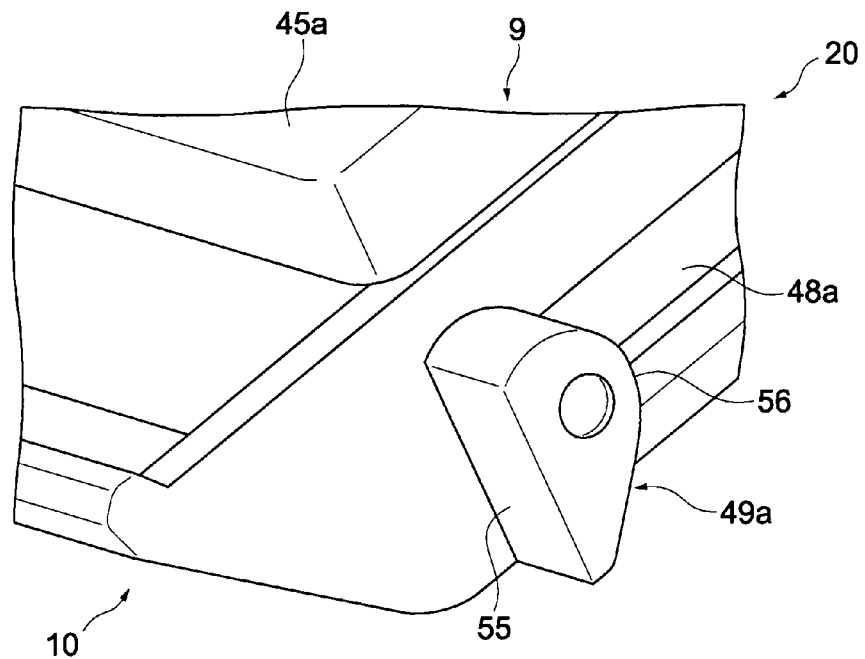
[FIG. 11] A partially-enlarged diagram schematically showing a front side of a side surface shown in FIG. 9.
Figure 12:
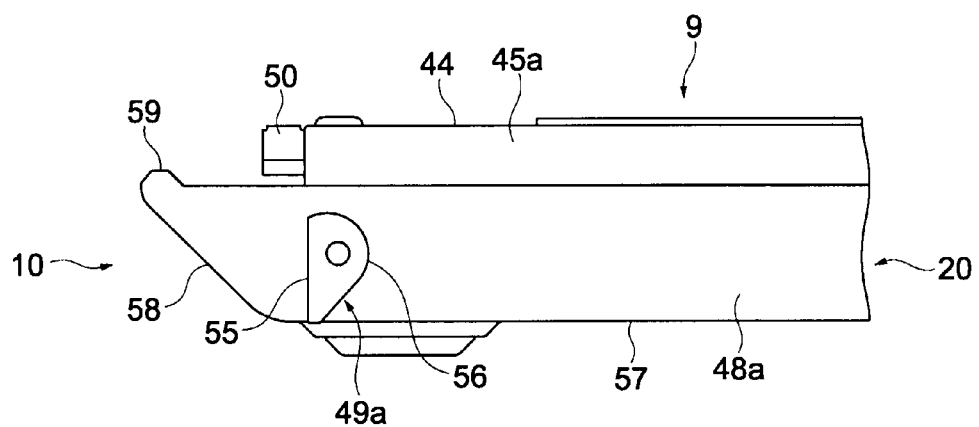
[FIG. 12] A side view showing a front side of the battery pack seen from the side surface side shown in FIG. 9.

FIG. 11 is a partially-enlarged diagram schematically showing the front side 10 of the side surface 48a. FIG. 12 is a side view showing the front side 10 of the battery pack 9 seen from the side surface 48a side. Further, FIG. 13 is a diagram showing the front side 10 of a cross-sectional diagram taken along the line A-A shown in FIG. 9.

As shown in FIGS. 11 and 12, the first boss 49a protrudes from the side surface 48a in a direction orthogonal to the direction in which the side surface 48a extends. The first boss 49a includes a flat surface portion 55 on the front side 10 and a curved surface portion 56 on the rear side 20. The first boss 49b provided on the side surface 48b as the other side surface also has the same shape.

As shown in FIG. 12, a second boss 50 is provided on the lower surface 44 of the first casing portion 45a on the front side 10 of the first casing portions 45a and 45b. The second boss 50 protrudes in the extension direction of the side surface 48a.

Figure 13:
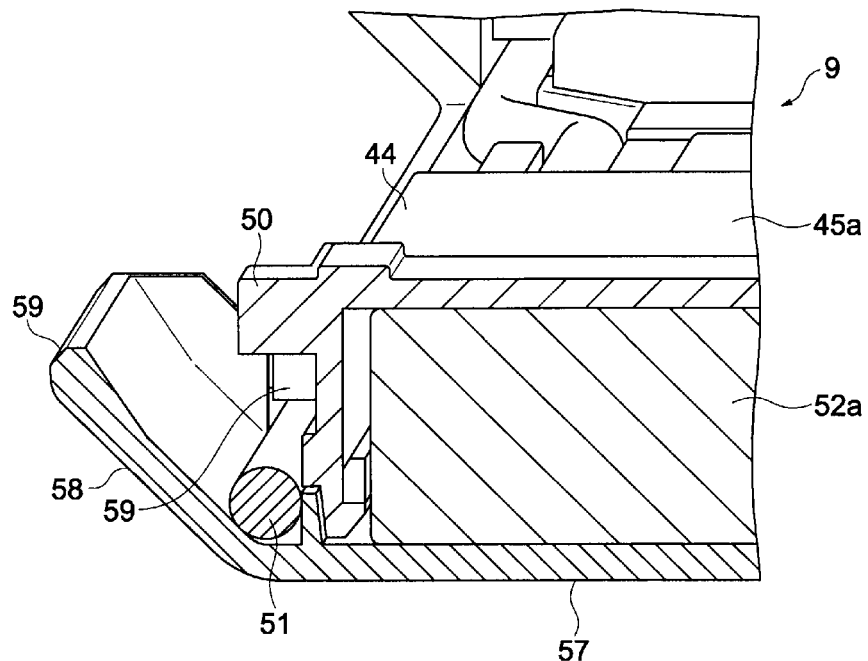
[FIG. 13] A diagram showing a front side of a cross-sectional diagram taken along the line A-A shown in FIG. 9.

Further, as shown in FIGS. 12 and 13, a cover 58 that extends obliquely from an upper surface 57 (corresponding to back surface 14 shown in FIG. 3) on the other side of the lower surface 44 of the battery pack 9 toward the lower surface 44 side is provided on the front side 10 of the battery pack 9. A tip end 59 of the cover 58 and the second boss 50 are positioned at almost the same height with respect to the upper surface 57. The bar-type reinforcement member 51 is provided across the cover 58, the first casing portions 45a and 45b, and the second casing portion 46. The reinforcement member 51 is fixed by a stopper portion 59 provided on the front side 10 of the first casing portions 45a and 45b and the second casing portion 46.

Figure 14:
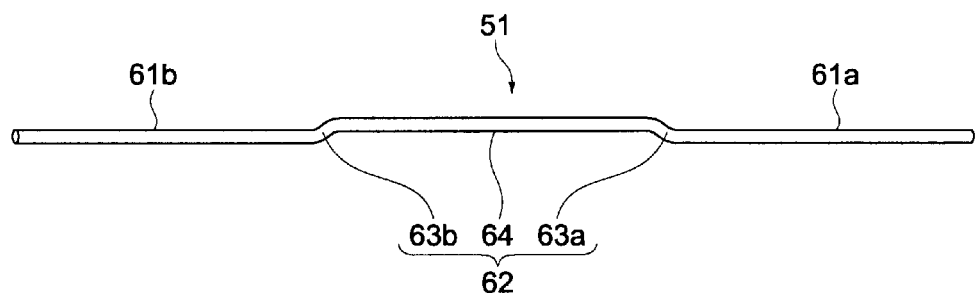
[FIG. 14] A schematic diagram showing a reinforcement member shown in FIG. 9.

FIG. 14 is a schematic diagram showing the reinforcement member 51. As shown in FIG. 14, the reinforcement member 51 includes first reinforcement portions 61a and 61b that come into contact with the first casing portions 45a and 45b, respectively, and a second reinforcement portion 62 that comes into contact with the second casing portion 46. The second reinforcement portion 62 is provided between the first reinforcement portions 61a and 61b and coupled to the first reinforcement portions 61a and 61b. With this structure, in this embodiment, the first reinforcement portions 61a and 61b and the second reinforcement portion 62 are integrated.

The first reinforcement portions 61a and 61b extend along the direction in which the first casing portions 45a and 45b and the second casing portion 46 are arranged. The second reinforcement portion 62 includes first coupling portions 63a and 63b that are coupled to the first reinforcement portions 61a and 61b in a direction different from that direction. Moreover, the second reinforcement portion 62 includes a second coupling portion 64 that is coupled to the first coupling portions 63a and 63b. The second coupling portion 64 is brought into contact with the second casing portion 46 in a direction in which the first reinforcement portions 61a and 61b are provided.

Since the reinforcement member 51 is provided in the battery pack 9, the battery pack 9 can be reinforced in the direction in which the first casing portions 45a and 45b and the second casing portion 46 are arranged. Further, the first coupling portions 63a and 63b are coupled to the first reinforcement portions 61a and 61b, respectively, in the direction different from the direction in which the first reinforcement portions 61a and 61b are provided. With this structure, the battery pack 9 can also be reinforced in a twisting direction about the direction in which the first casing portions 45a and 45b and the second casing portion 46 are arranged.

The battery pack 9 of this embodiment can be thinned, but thinning may cause the battery pack to be easily deformed due to an external force, for example. However, by reinforcing the battery pack 9 by the reinforcement member 51 as described above, the battery pack 9 can be prevented from being deformed.

Typically, a metallic bar formed of stainless steel, iron, and the like is used as the reinforcement member 51. In this embodiment, the first reinforcement portions 61a and 61b are brought into contact with the first casing portions 45a and 45b, respectively, and the second reinforcement portion 62 is brought into contact with the second casing portion 46, though not limited thereto. However, since the thickness of the second casing portion 46 is smaller than that of the first casing portions 45a and 45b, the second casing portion 46 is deformed more easily than the first casing portions 45a and 45b. Therefore, by causing the second reinforcement portion 62 including the first coupling portions 63a and 63b and the second coupling portion 64 to come into contact with the second casing portion 46, the battery pack 9 can be reinforced effectively.

FIG. 15 are front views showing a rear surface 66 on the rear side 20 of the battery pack 9 shown in FIG. 9. FIG. 15(A) is a diagram showing substantially the center of the rear surface 66. FIG. 15(B) is a diagram showing the side surface 48a side of the rear surface 66.

As shown in FIG. 15(A), at substantially the center of the rear surface 66, a release engagement boss 67 and a connector portion 68 are provided. The release engagement boss 67 is formed from the upper surface 57 side toward the lower surface 44 side and fixed to the rear surface 66. On the lower surface 44 side of the release engagement boss 67, a tapered surface 69 is provided. The connector portion 68 is electrically connected to the control board 53 incorporated in the second casing portion 46. Therefore, the connector portion 68 is provided at a position corresponding to the second casing portion 46 (convex portion 46') of the rear surface 66. However, the connector portion 68 may be provided at other positions on the rear surface 66.

As shown in FIG. 15(B), a lock engagement boss 70 is provided on the side surface 48a side of the rear surface 66. The lock engagement boss 70 is also formed from the upper surface 57 side toward the lower surface 44 side and fixed to the rear surface 66. Also on the lower surface 44 side of the lock engagement boss 70, a tapered surface 71 is provided.

(Battery Pack Mounting Method)

Figure 16:
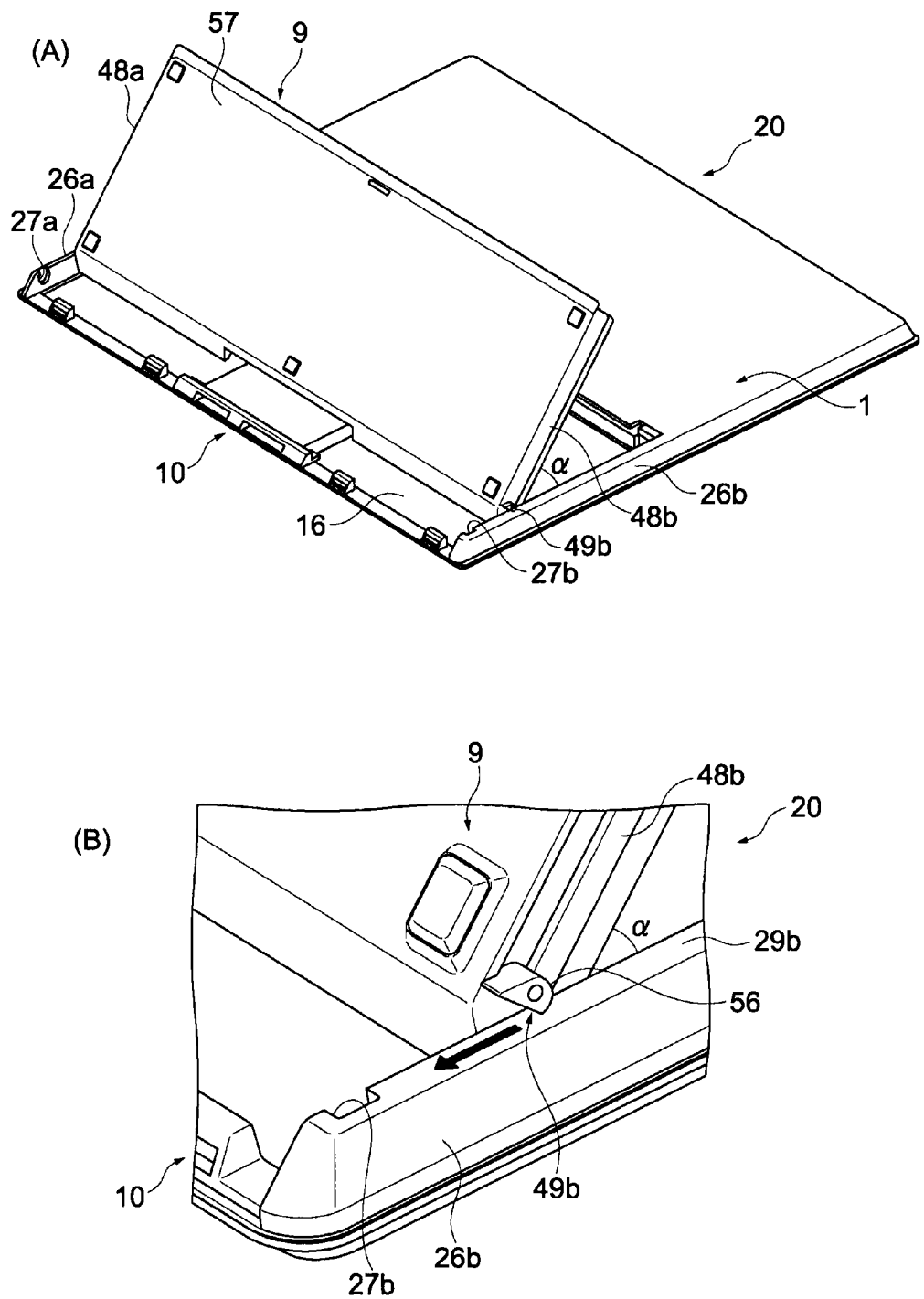
[FIG. 16] Diagrams for explaining a battery pack mounting method according to an embodiment of the present invention.

A method of mounting the battery pack 9 of this embodiment to the mounting portion 16 will be described. FIG. 16 are diagrams for explaining the method of mounting the battery pack 9. FIG. 16 show the battery pack 9 shown in FIG. 9 seen from the upper surface 57 side. FIG. 16(A) is an overall view of the battery pack 9 and the main body 1, and FIG. 16(B) is a partially-enlarged diagram of the front side 10 of the side wall 26b.

As shown in FIGS. 16(A) and 16(B), a pair of first bosses 49a and 49b provided on the side surfaces 48a and 48b of the battery pack 9 are mounted on the upper surfaces 29a and 29b of the pair of side walls 26a and 26b sandwiching the mounting portion 16. The battery pack 9 is moved along the side walls 26a and 26b toward the front side 10. As shown in FIG. 16(A), the battery pack 9 is mounted obliquely (at angle α) with respect to the side walls 26a and 26b.

As shown in FIG. 16(B), the first boss 49b provided on the side surface 48b includes a curved surface portion 56 on the rear side 20, and the curved surface portion 56 is mounted on the side wall 26b. Therefore, even when the battery pack 9 is not fixed to the side walls 26a and 26b at a predetermined angle, the battery pack 9 can be moved smoothly on the side walls 26a and 26b. For example, the angle α shown in FIGS. 16(A) and 16(B) may fluctuate when moving the battery pack 9. Therefore, workability in mounting the thinned battery pack 9 of this embodiment to the mounting portion 16 becomes favorable.

Figure 17:
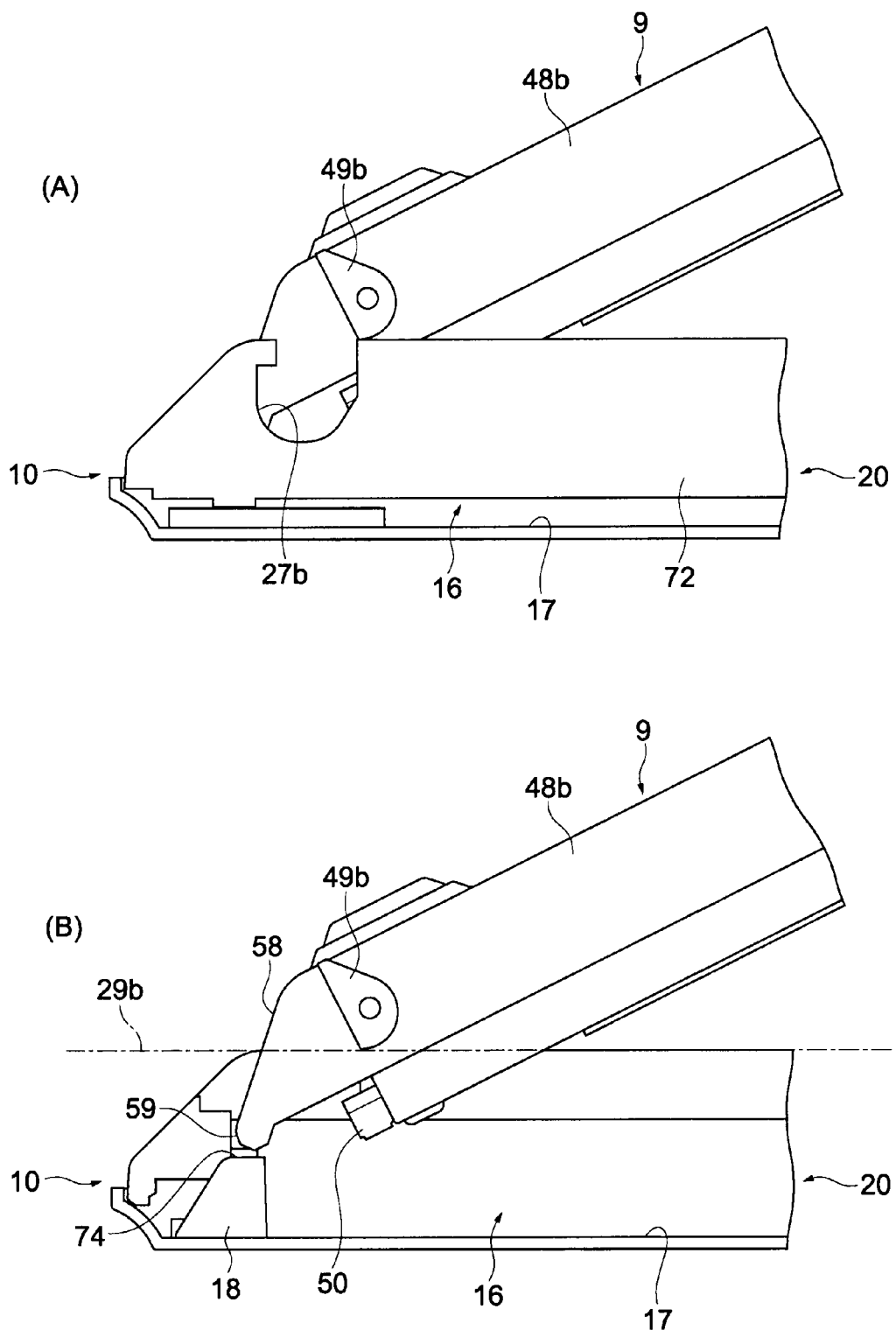
[FIG. 17] Side views seen from the side wall side showing an operation of mounting the battery pack shown in FIG. 16.
Figure 18:
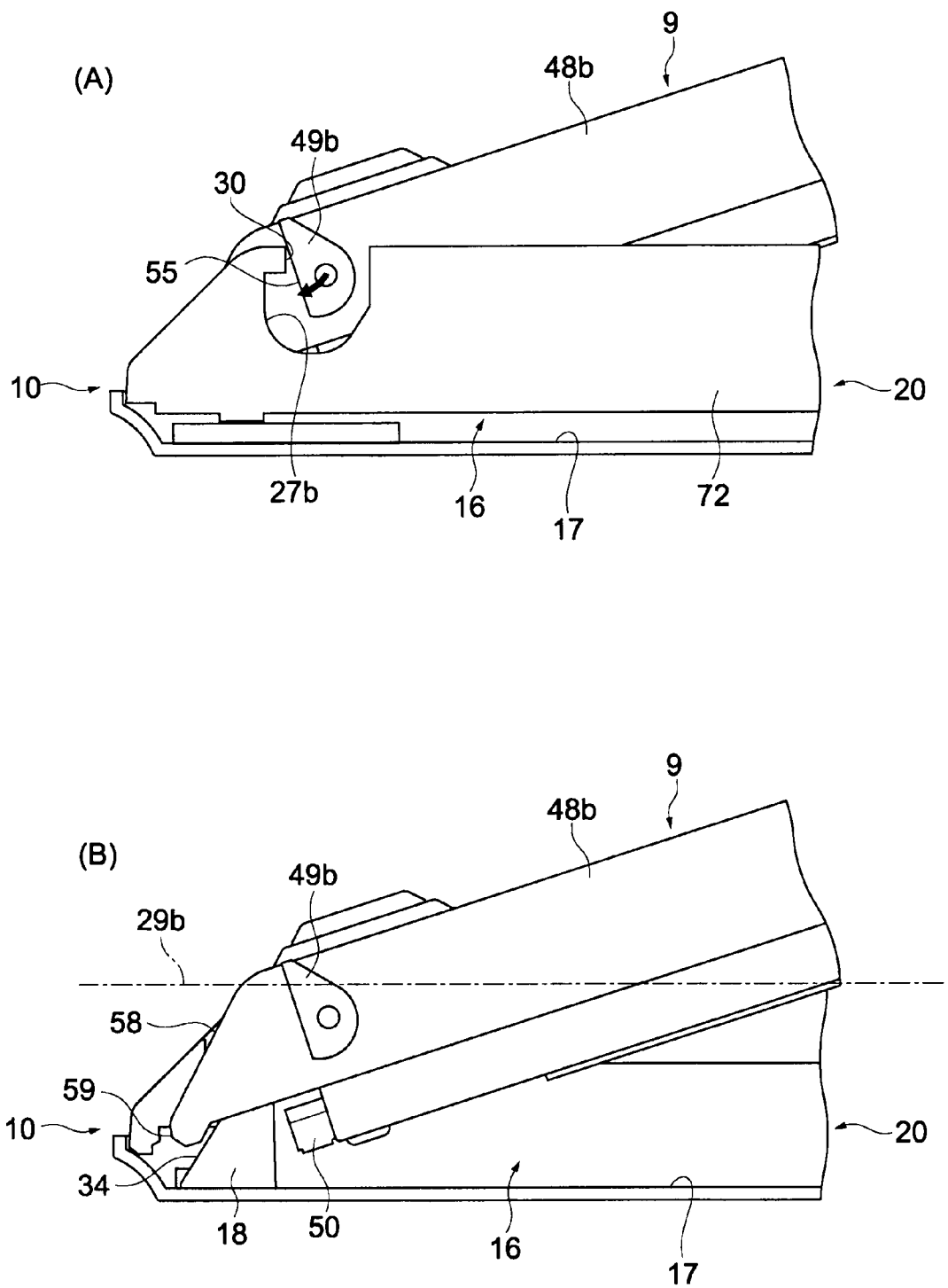
[FIG. 18] Side views seen from the side wall side showing an operation of mounting the battery pack shown in FIG. 16.

FIGS. 17 to 19 are side views seen from the side wall 26b side showing an operation of mounting the battery pack 9. In FIGS. 17(A), 18(A), and 19(A), to help understand the description, the plate 72 provided on the inner surface 28b of the side wall 26b is illustrated instead of the entire side wall 26b. In FIGS. 17(B), 18(B), and 19(B), for explaining the positional relationship between the mounting portion 16 and the battery pack 9 in the state shown in FIGS. 17(A), 18(A), and 19(A), an illustration of the side wall 26b (plate 72) is omitted. The dashed lines of FIGS. 17(B), 18(B), and 19(B) indicate the position of the upper surface 29b of the side wall 26b.

FIGS. 17(A) and 17(B) are diagrams showing a state right before the movement of the first boss 49b to the position of the notched portion 27b. Since the first boss 49b is mounted on the upper surface 29b of the side wall 26b, the battery pack 9 is positioned above the mounting surface 17, and the cover 58 is also positioned above the mounting surface 17. As shown in FIG. 17(B), on the front side 10 of the mounting portion 16, the protrusion 18 protruding from the mounting surface 17 is provided. In the states shown in FIGS. 17(A) and 17(B), the tip end 59 of the cover 58 is located higher than the upper surface 74 of the protrusion 18.

As shown in FIGS. 18(A) and 18(B), the first boss 49b fits inside the notched portion 27b while being moved to the front side 10. By the first boss 49b being fit inside the notched portion 27b, the battery pack 9 is moved toward the mounting surface 17, and the cover 58 of the battery pack 9 is moved toward the protrusion 18. At this time, the tip end 59 of the cover 58 passes above the upper surface 74 of the protrusion 18 and is moved to the front side 10 of the tapered portion 34 of the protrusion 18. Therefore, the cover 58 is moved toward the protrusion 18 so as to cover the protrusion 18.

Further, as shown in FIG. 18(A), the flat surface portion 55 provided on the front side 10 of the first boss 49b comes into contact with the contact portion 30 of the notched portion 27b. After the flat surface portion 55 is brought into contact with the contact portion 30, a force that moves the battery pack 9 to the front side 10 changes to a force for rotating the first boss 49b (see arrow shown in FIG. 18(A)). Accordingly, the battery pack 9 is guided in the rotational direction.

FIGS. 19(A) and 19(B) are diagrams showing a state where the battery pack 9 is mounted to the mounting portion 16. The first boss 49b engages with the notched portion 27b, and the first boss 49b is fixed inside the notched portion 27b. In this embodiment, the first boss 49b is fixed while the flat surface portion 55 of the first boss 49b is brought into contact with the contact portion 30 of the notched portion 27b. Moreover, as shown in FIG. 19(B), the second boss 50 provided on the front side 10 of the battery pack 9 engages with the engagement hole 33 of the protrusion 18. Thus, the protrusion 18 is covered by the cover 58 of the battery pack 9.

In this embodiment, the pair of first bosses 49a and 49b provided on the pair of side surfaces 48a and 48b of the battery pack 9 can be mounted on the pair of side walls 26a and 26b of the main body 1. The first bosses 49a and 49b are moved along the side walls 26a and 26b. Further, the first bosses 49a and 49b engage with the pair of notched portions 27a and 27b provided on the side walls 26a and 26b. At this time, the engagement hole 33 of the protrusion 18 protruding from the mounting surface 17 engages with the second boss 50. Therefore, positioning of the second boss 50 for engaging the engagement hole 33 and the second boss 50 with each other becomes easier, and the thinned battery pack 9 can be mounted to the mounting portion 16 with ease.

Figure 20:
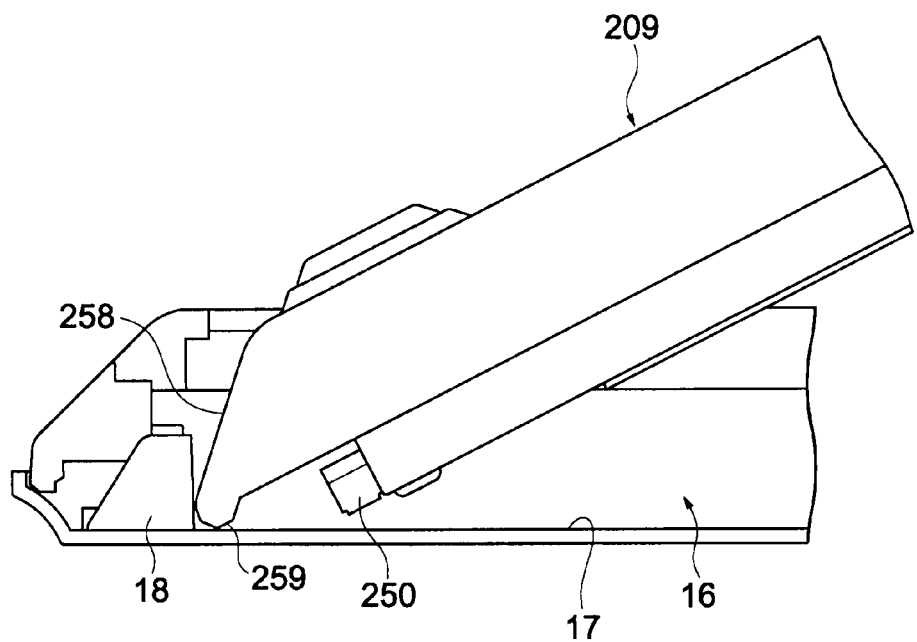
[FIG. 20] A diagram showing a battery pack without a first boss as a comparative example.

Here, a case where the first bosses 49a and 49b are not provided on the side surfaces 48a and 48b of the battery pack 9 will be discussed. FIG. 20 is a diagram showing, as a comparative example, a battery pack 209 that is not provided with the first bosses 49a and 49b.

For example, as shown in FIG. 20, the battery pack 209 is moved on the mounting surface 17 to engage the engagement hole 33 of the protrusion 18 with a second boss 250 of the battery pack 209. In this case, a tip end 259 of a cover 258 of the battery pack 209 is brought into contact with the protrusion 18, with the result that the engagement hole 33 and the second boss 250 are inhibited from engaging with each other. To avoid this, the battery pack 209 needs to be lifted up with respect to the mounting surface 17 before the protrusion 18 and the cover 258 come into contact with each other, and this leads to poor workability in mounting the battery pack 209.

In this embodiment, however, since the pair of first bosses 49a and 49b are mounted on the pair of side walls 26a and 26b as shown in FIG. 17, the cover 58 is positioned above the mounting surface 17. With this structure, the cover 58 and the protrusion 18 can be prevented from coming into contact with each other, and it becomes possible to smoothly engage the engagement hole 33 and the second boss 50 with each other. Moreover, the protrusion 18 can be covered by the cover 58.

Further, in general, structures other than the protrusion 18 as in this embodiment may be mounted on the mounting surface. In this case, when the battery pack is moved on the mounting surface, the structures and the battery pack may come into contact with each other to thus inhibit the mounting of the battery pack. In other words, also in a case where the battery pack that is not provided with the cover 58 as in this embodiment is mounted, the mounting method of this embodiment in which the battery pack is moved on the side walls is effective.

The positions of the notched portions 27a and 27b provided on the pair of side walls 26a and 26b may be set as appropriate based on the positions and height of the protrusions 18, the shape of the cover 58, and the like. In this embodiment, the side walls 26a and 26b are integrated with the side surfaces 13a and 13b of the main body 1. However, the structure is not limited thereto, and the pair of side walls sandwiching the mounting portion 16 only need to be provided based on the size of the mounting portion 16 provided in the main body 1 and the position of the mounting portion 16, so that the pair of notched portions as those of this embodiment are formed on those pair of side walls. By mounting the battery pack having the first bosses as those of this embodiment to the mounting portion while moving it along the pair of side walls, the battery pack can be mounted to the mounting portion with ease.

FIG. 21 are front views showing the rear surface 35 of the main body 1 in a case where the battery pack 9 is mounted. FIG. 21 show only the release engagement boss 67 and the lock engagement boss 70 in the mounted battery pack 9. The battery pack 9 is mounted to the mounting portion 16 from the upper side of FIG. 21.

As shown in FIG. 21(A), the release boss 37 of the main body 1 engages with the release engagement boss 67 of the battery pack 9. The tapered surface 69 of the release engagement boss 67 is brought into contact with the tapered surface 40 of the release boss 37, and the release boss 37 is moved to the left-hand side in FIG. 21(A). When the tapered surface 69 of the release engagement boss 67 is moved to the lower side of the tapered surface 40 of the release boss 37, the release boss 37 biased to the right-hand side moves to the right-hand side. Accordingly, the release boss 37 and the release engagement boss 67 engage with each other. Connected to the connector portion 68 is the connector portion 68 (see FIG. 15) of the battery pack 9 which is not shown in FIG. 21(A).

As shown in FIG. 21(B), the lock boss 41 of the main body 1 engages with the lock engagement boss 70 of the battery pack 9. Before mounting the battery pack 9, the lock lever 42 is moved manually to the right-hand side in FIG. 21(B). When the battery pack 9 is mounted to the mounting portion 16, the lock engagement boss 70 of the battery pack 9 is mounted to the lock portion 12a of the main body 1. When the lock engagement boss 70 is mounted, the lock lever 42 is manually moved to the left-hand side to thus engage the lock boss 41 with the lock engagement boss 70. Also in the other lock portion 12b, the lock boss 41 engages with the lock engagement boss 70 in the same manner. Due to the lock portions 12a and 12b, the battery pack 9 can be prevented from coming out of the mounting portion 16 even when the release portion 11 is damaged or an external force is applied to the main body 1, for example.

(Battery Pack Removing Method)

A method of removing the battery pack 9 of this embodiment from the mounting portion 16 will be described. First, the lock lever 42 of the lock portions 12a and 12b provided in the vicinity of the side surfaces 13a and 13b of the main body shown in FIG. 3 is operated manually. Then, the engagement of the lock boss 41 of the main body 1 and the lock engagement boss 70 of the battery pack 9 at the lock portions 12a and 12b is released (see FIG. 21). Next, the release lever 36 of the release portion 11 is operated manually to release the engagement of the release boss 37 and the release engagement boss 67. The battery pack 9 is removed from the mounting portion 16 while the position of the release lever 36 is kept in the state where the engagement is released. In this embodiment, the rear side 20 of the battery pack 9 is lifted up, and the battery pack 9 is turned to be taken out of the mounting portion 16.

Figure 23:
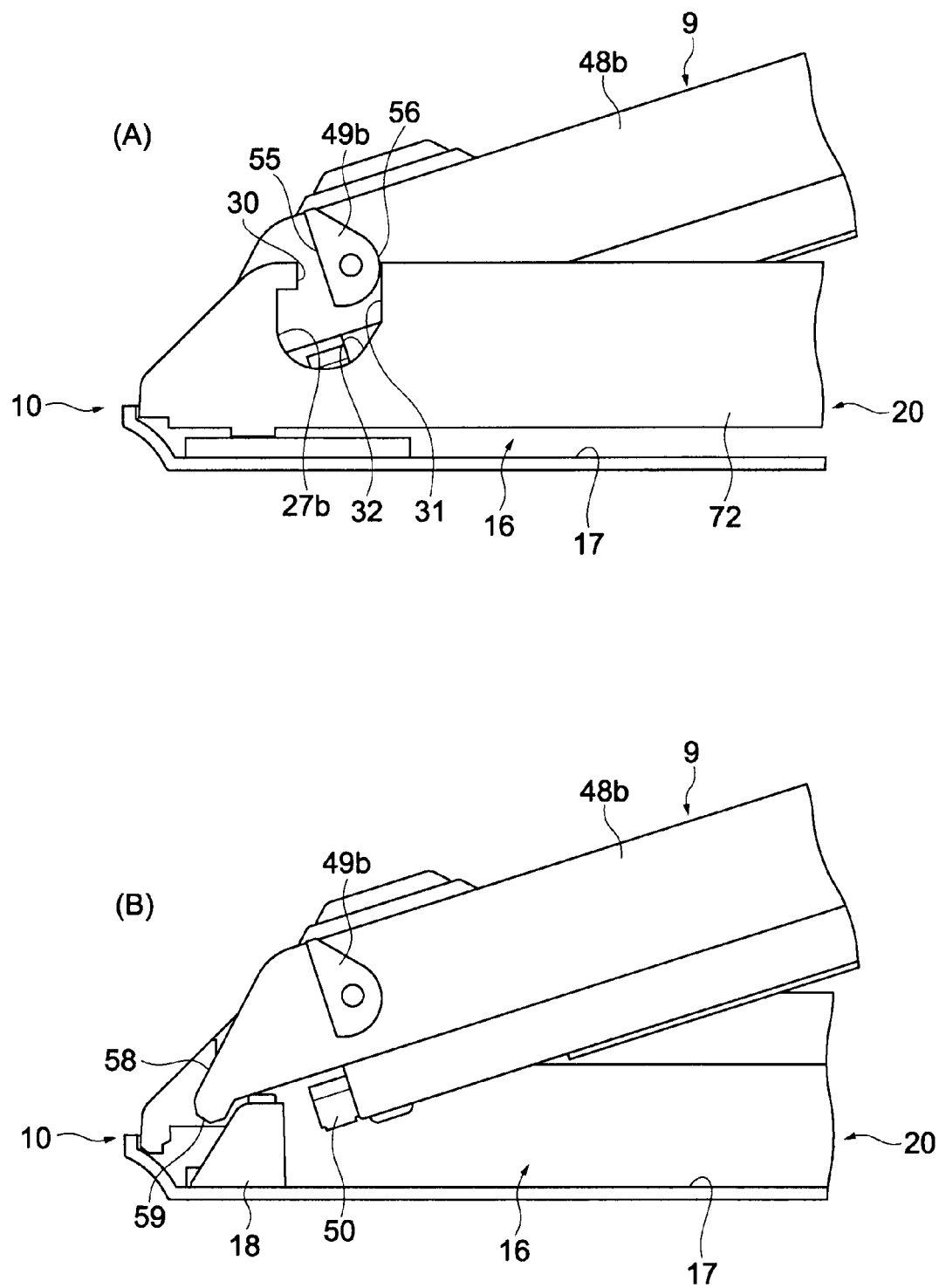
[FIG. 23] Side views seen from the side wall side showing an operation of removing the battery pack shown in FIG. 3.
Figure 24:
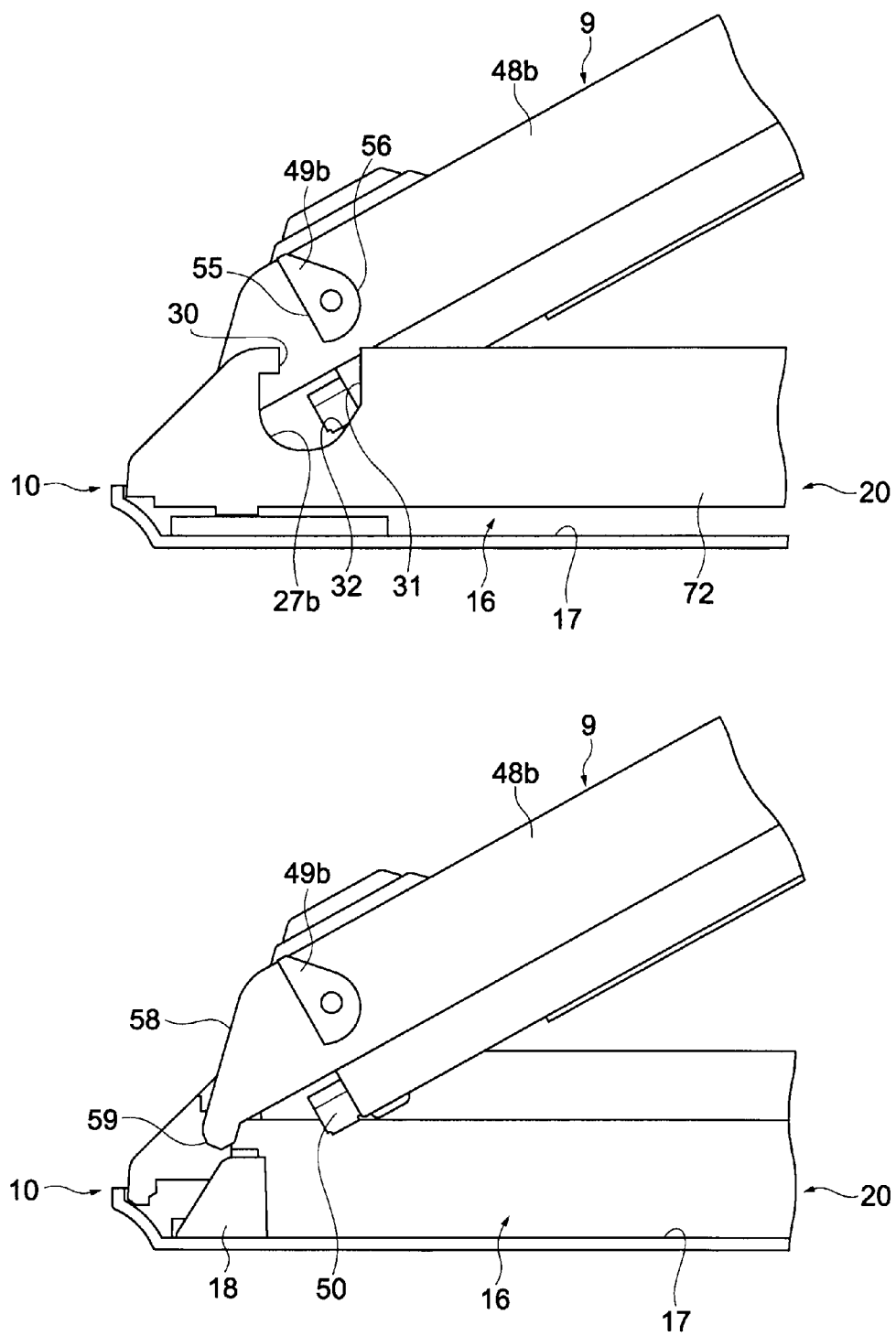
[FIG. 24] Side views seen from the side wall side showing an operation of removing the battery pack shown in FIG. 3.

FIGS. 22 to 24 are side views seen from the side wall side 26b side showing an operation of removing the battery pack 9. As shown in FIG. 22(A), the flat surface portion 55 of the first boss 49b of the battery pack 9 is in contact with the contact portion 30 of the notched portion 27b provided on the side wall 26b. Therefore, the battery pack 9 rotates about the portion where the first boss 49b and the contact portion 30 are in contact with each other (see arrow shown in FIG. 22(A)). Accordingly, the battery pack 9 is turned and moved in the direction extending from the front side 10 to the rear side 20.

The direction extending from the front side 10 to the rear side 20 is a direction in which the second boss 50 of the battery pack 9 comes out of the engagement hole 33 of the protrusion 18 protruding from the mounting surface 17. In other words, the battery pack 9 is moved in the direction in which the second boss 50 comes out of the engagement hole 33 of the protrusion 18 at the time the battery pack 9 is turned.

As shown in FIGS. 23(A) and 23(B), the first boss 49b that has been turned and moved to the rear side 20 is moved upwardly along the tapered surface 32 and the flat surface portion 31 provided on the rear side 20 of the notched portion 27b. At this time, since the curved surface portion 56 of the first boss 49b is brought into contact with the tapered surface 32 and the flat surface portion 31, the first boss 49b is moved upwardly while being rotated. Then, as shown in FIGS. 24(A) and 24(B), the first boss 49b comes out of the notched portion 27b, and the battery pack 9 is removed from the mounting portion 16.

Figure 25:
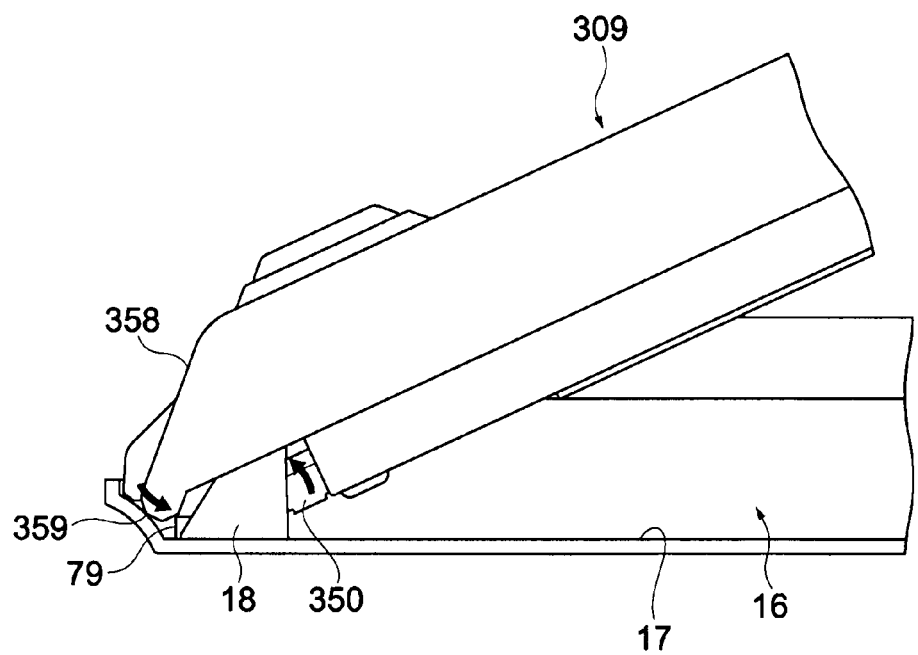
[FIG. 25] A diagram showing a battery pack without a first boss as a comparative example.
Figure 26:
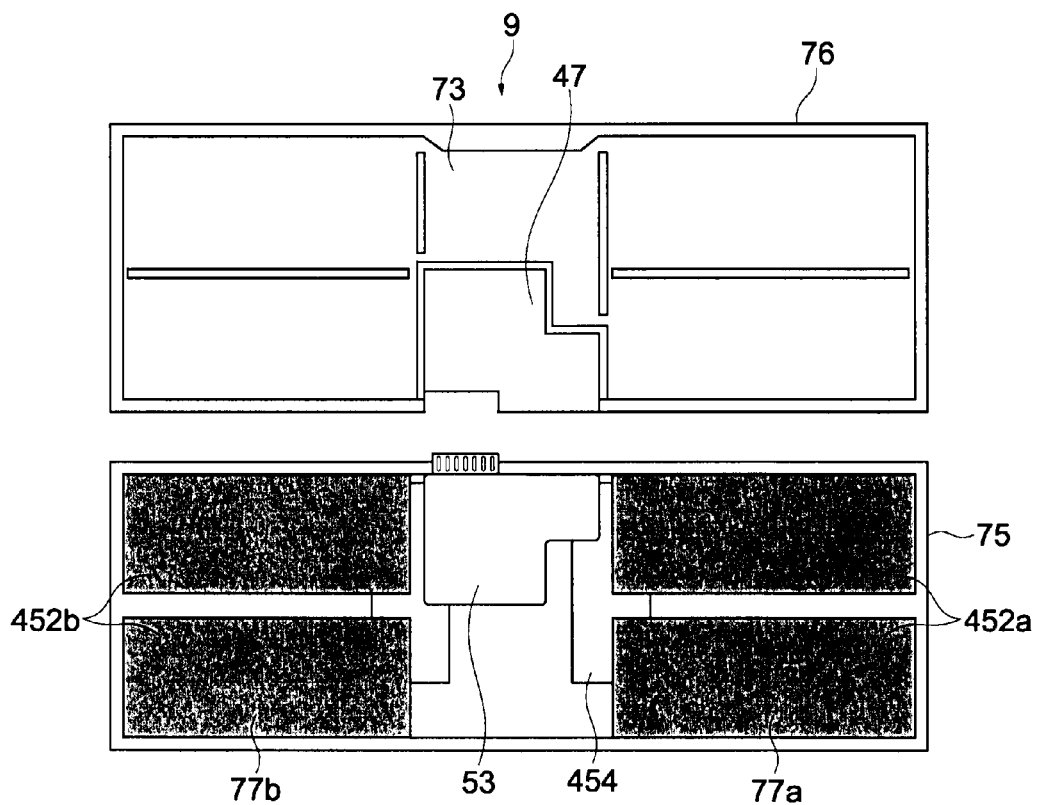
[FIG. 26] A diagram showing a modified example of the battery pack shown in FIG. 10.

FIG. 25 is a diagram showing a battery pack 309 without the first bosses 49a and 49b as a comparative example. Unlike the battery pack 9 of this embodiment, the battery pack 309 not provided with the first boss 49b does not rotate about the portion at which the first boss 49b and the contact portion 30 are in contact with each other. Therefore, there may be a case where, for example, a second boss 350 engaged with the engagement hole 33 of the protrusion 18 gets caught in the engagement hole 33 in the rotational direction as shown in FIG. 26 (see arrow of second boss 350 shown in FIG. 26). Alternatively, a tip end 359 of a cover 358 might get caught at a portion 79 on the front side 10 of the mounting portion 16 (see arrow of tip end 359 of cover 358 shown in FIG. 26). As a result, the rotation of the battery pack 309 is inhibited, and the battery pack 309 cannot be removed from the mounting portion 16. If the battery pack 309 is removed forcedly, the caught portion of the engagement hole 33 and the second boss 350 described above, the caught portion of the tip end 359 of the cover 358 and the portion 79 of the mounting portion 16, and the like may break.

On the other hand, in this embodiment, the first boss 49b is in contact with the contact portion 30 of the notched portion 27b as shown in FIGS. 22 to 24, and the battery pack 9 is moved in the direction in which the second boss 50 comes out of the engagement hole 33 when being turned. Accordingly, it is possible to prevent the second boss 50 from getting caught in the engagement hole 33 in the rotational direction. Considering the user of the electronic apparatus 100, the battery pack 9 only needs to be turned to move as described above and be removed from the mounting portion 16. In other words, workability in removing the battery pack 9 is favorable.

The shapes of the notched portion 27b and the first boss 49b may be set as appropriate based on the shape and positions of the protrusions 18, size of the engagement hole 33, shape and position of the second boss 50, shape of the cover 58, and the like. In this embodiment, for example, the flat surface portion 55 is provided on the front side 10 of the first boss 49b as shown in FIGS. 22 to 24. However, the structure is not limited thereto, and the front side 10 of the first boss 49b may be structured such that only the portion that comes into contact with the contact portion 30 of the notched portion 27b at the time the battery pack 9 is mounted to the mounting portion 16 is a flat surface, for example.

The shape of the rear side 20 of the first boss 49b also only needs to be set as appropriate. In this embodiment, the curved surface portion 56 is provided on the rear side 20 of the first boss 49b. However, the shape is not limited thereto, and the shape of the first boss 49b on the rear side 20 when seen from the side surface 48b may be a polygon that is close to an arc, for example.

Further, the first boss 49b and the contact portion 30 do not need to be in contact with each other in the state where the battery pack 9 is mounted to the mounting portion 16. It is also possible for the first boss 49b and the contact portion 30 to come into contact with each other and the battery pack 9 to move in the direction in which the second boss 50 comes out of the engagement hole 33 when the battery pack 9 is turned to be removed.

MODIFIED EXAMPLE

The present invention is not limited to the above embodiment and can be variously modified without departing from the gist of the present invention.

For example, FIG. 26 is a diagram showing a modified example of the battery pack 9 shown in FIG. 10. In the battery pack 9, two secondary batteries 452b are incorporated in the area 77a of the accommodating plate 75, and two secondary batteries 452b are similarly incorporated in the area 77b. The secondary batteries 452a and 452b are electrically connected to the control board 53 by a wiring sheet metal 454. The secondary batteries 452a and 452b have smaller areas than the secondary batteries 52a and 52b shown in FIG. 10.

By providing the plurality of secondary batteries 452a and 452b having small areas inside the first casing portions 45a and 45b (battery accommodating portions 45'a and 45'b) as described above, the capacity of the battery pack 9 can be prevented from becoming smaller. The area size and number of secondary batteries to be incorporated in the first casing portions 45a and 45b (battery accommodating portions 45'a and 45'b) only need to be set as appropriate so that desired power can be obtained. For example, the secondary batteries may be accommodated in at least one of the first casing portions 45a and 45b (battery accommodating portions 45'a and 45'b). Further, the wiring sheet metal 54 (wiring sheet metal 454) does not need to be used as in this embodiment when electrically connecting the secondary batteries and the control board incorporated inside the battery pack 9. For example, the secondary batteries and the control board may directly be brought into contact with each other to be electrically connected to each other.

Figure 27:
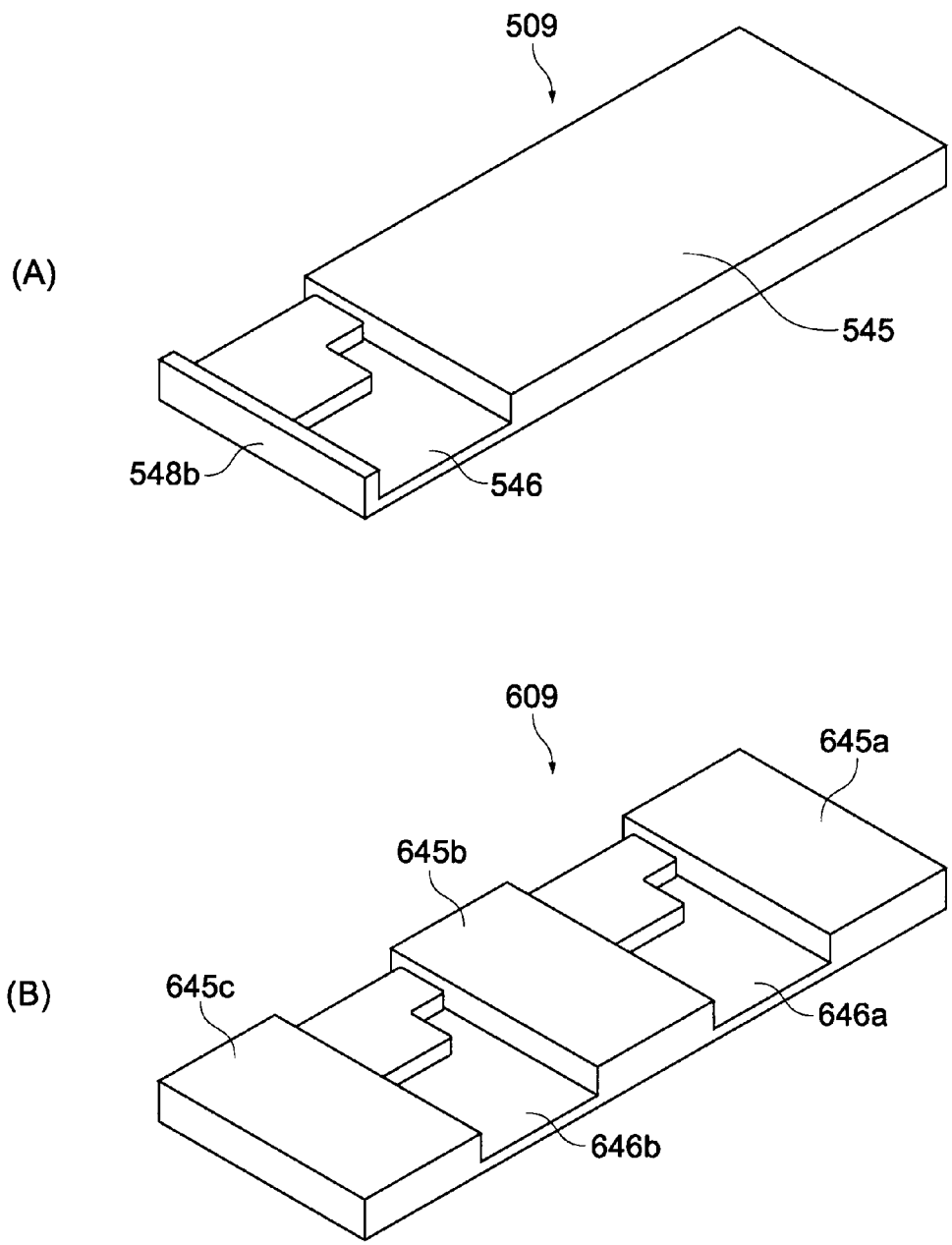
[FIG. 27] Diagrams showing modified examples of the battery pack shown in FIG. 9.

FIG. 27 are diagrams showing modified examples of the battery pack 9 shown in FIG. 9. A battery pack 509 shown in FIG. 27(A) includes a second casing portion 546 provided on one side surface 548b and a first casing portion 545 that has a large area and is adjacent to the second casing portion 546. A battery pack 609 shown in FIG. 27(B) includes three first casing portions 645a, 645b, and 645c and two second casing portions 646a and 646b provided among those first casing portions.

As shown in FIGS. 27(A) and 27(B), the size of the area of the first casing portions, the number of first and second casing portions, the arrangement positions of the first and second casing portions, and the like may be set as appropriate based on other members arranged in the electronic apparatus and the position at which the battery pack is mounted. Moreover, a battery pack having, for example, an L-shaped flat surface configuration in which the first and second casing portions are not aligned linearly is also possible.

FIG. 28 are diagrams showing modified examples of the reinforcement member 51 shown in FIG. 14. A reinforcement member 751 shown in FIG. 28(A) is obtained by deforming the shape of the first coupling portions 63a and 63b of the reinforcement member 51 shown in FIG. 14. First coupling portions 763a and 763b of the reinforcement member 751 are coupled to first reinforcement portions 761 and 761b, respectively. The first coupling portions 763a and 763b are coupled to a second coupling portion 764. The first coupling portions 763a and 763b and the second coupling portion 764 constitute a second reinforcement portion 762.

In a reinforcement member 851 shown in FIG. 27(B), first coupling portions 863a and 863b that are coupled to first reinforcement portions 861 and 861b, respectively, are coupled to each other. In other words, a second reinforcement portion 862 of the reinforcement member 851 is constituted of the first coupling portions 863a and 863b.

The above embodiment has described the example in which the present invention is applied to a laptop personal computer. However, the present invention is not limited thereto and is also applicable to other electronic apparatuses that use a detachable battery pack.

DESCRIPTION OF SYMBOLS 1 main body
2 display portion
4 front side of main body
5 keyboard
6a, 6b palm rest portion
7 pointing device
8 back side of main body
9, 509, 609 battery pack
16 mounting portion
17 mounting surface
18 protrusion
26a, 26b side wall of main body
27a, 27b notched portion
30 contact portion
33 engagement hole
45a, 45b, 545, 645a, 645b, 645c first casing portion
45'a, 45'b battery accommodating portion
46, 546, 646a, 646b second casing portion
46' concave portion
48a, 48b side surface of battery pack 49a, 49b first boss
50 second boss
51, 751, 851 reinforcement member
52a, 52b, 452a, 452b secondary battery
53 control board
58 cover
61a, 61b, 761a, 761b, 861a, 861b first reinforcement portion
62, 762, 862 second reinforcement portion
63a, 63b, 763a, 763b, 863a, 863b first coupling portion
64, 764 second coupling portion
68 connector portion of battery pack
100 electronic apparatus

The invention claimed is:

1. An electronic apparatus, comprising:
a main body including a mounting portion and a main terminal; and
a battery pack that is mounted to the mounting portion, the battery pack including:
a battery terminal for delivering power from the battery pack to the main terminal,
at least one secondary battery for supplying power to the main body through the battery terminal,
a control board electrically connected between the at least one secondary battery and the battery terminal,
a plurality of first casing portions that each have a first thickness, each of the first casing portions have a secondary battery incorporated therein, and
a second casing portion that has a second thickness smaller than the first thickness, the second casing portion having the control board incorporated therein,
wherein the plurality of first casing portions and the second casing portion are arranged linearly in a first direction such that the second casing portion is provided between the plurality of first casing portions.

2. The electronic apparatus according to claim 1, further comprising a display portion connected to the main body, wherein the main body includes a front side, a keyboard provided on the front side, a plurality of palm rest portions adjacent to the keyboard on a side opposite to a side on which the display portion is connected, a pointing device that is aligned linearly with the plurality of palm rest portions in the first direction such that the pointing device is placed between the plurality of palm rest portions, and a back side on which the mounting portion is provided, and wherein the battery pack is mounted to the mounting portion on the back side such that the plurality of first casing portions are arranged at positions respectively corresponding to the plurality of palm rest portions and the second casing portion is arranged at a position corresponding to the pointing device.

3. The electronic apparatus according to claim 2, wherein the main body includes the mounting portion including a mounting surface opposed to the battery pack on the back side, a pair of side walls that face each other in the first direction and sandwich the mounting portion, a pair of notched portions provided on the pair of side walls, respectively, a protrusion protruding from the mounting surface, and an engagement hole that is provided on the protrusion and opens in a second direction intersecting the first direction in a planar direction of the mounting surface, and wherein the battery pack includes a pair of side surfaces opposed to the pair of side walls, respectively, in the first direction, a pair of first bosses that respectively protrude from the pair of side surfaces in the first direction and engage with the pair of notched portions, respectively, the pair of first bosses capable of being mounted on the pair of side walls at a time the battery pack is to be mounted, and a second boss that protrudes in the second direction and engages with the engagement hole at a time the pair of first bosses engage with the pair of notched portions.

4. The electronic apparatus according to claim 3, wherein the battery pack includes a cover that covers the protrusion when the battery pack is mounted.

5. The electronic apparatus according to claim 3, wherein the pair of notched portions each include a contact portion that comes into contact with the corresponding one of the pair of first bosses for moving the battery pack in a direction in which the second boss comes out of the engagement hole at a time the battery pack is turned to be removed from the mounting portion.

6. The electronic apparatus according to claim 1, wherein the battery pack includes a reinforcement member including a plurality of first reinforcement portions that are provided in a direction in which the plurality of first casing portions and the second casing portion are arranged, and a second reinforcement portion that includes a plurality of first coupling portions that are respectively coupled to the plurality of first reinforcement portions in a direction different from the direction in which the plurality of first casing portions and the second casing portion are arranged, the second reinforcement portion being arranged between the plurality of first reinforcement portions.

7. The electronic apparatus according to claim 6, wherein the plurality of first reinforcement portions respectively come into contact with the plurality of first casing portions, and wherein the second reinforcement portion includes a second coupling portion that is coupled with the plurality of first coupling portions and provided in the direction in which the plurality of first casing portions and the second casing portion are arranged, the second reinforcement portion being brought into contact with the second casing portion.

8. A battery pack, comprising:
a battery terminal for delivering power from the battery pack to an electronic device;
at least one secondary battery for supplying the power to the electronic device through the battery terminal;
a control board electrically connected between the at least one secondary battery and the battery terminal;
a plurality of first casing portions that each have a first thickness, each of the first casing portions have a secondary battery incorporated therein; and
a second casing portion that has a second thickness smaller than the first thickness, the second casing portion having the control board incorporated therein,
wherein the plurality of first casing portions and the second casing portion are arranged linearly in a first direction such that the second casing portion between the plurality of the first casing portions.

9. A battery pack, comprising:
a battery terminal for delivering power from the battery pack to an electronic device;
at least one secondary battery for supplying power to the electronic device through the battery terminal;
a control board electrically connected between the at least one secondary battery and the battery terminal;
two first casing portions each having a first thickness, each of the first casing portions having a secondary battery incorporated therein; and
a second casing portion that has a second thickness smaller than the first thickness, the second casing portion having the control board incorporated therein and being provided between the two first casing portions,
wherein the plurality of first casing portions and the second casing portion are arranged linearly in a first direction such that the second casing portion is provided between the plurality of first casing portions.

10. The battery pack according to claim 9, wherein the battery terminal is provided in the second casing portion.

\* \* \* \* \*